(12) United States Patent
Lake et al.

(10) Patent No.: US 12,219,669 B2
(45) Date of Patent: Feb. 4, 2025

(54) ELECTRIC BRAKING RESISTOR-BASED HEAT GENERATOR FOR PROCESS FLUIDS AND EMULSIONS

(71) Applicants: Stoney Dean Lake, Kilgore, TX (US); Robert Dean Alsup, Wylie, TX (US)

(72) Inventors: Stoney Dean Lake, Kilgore, TX (US); Robert Dean Alsup, Wylie, TX (US)

( * ) Notice: Subject to any disclaimer, the term of this patent is extended or adjusted under 35 U.S.C. 154(b) by 0 days.

(21) Appl. No.: 18/523,693

(22) Filed: Nov. 29, 2023

(65) Prior Publication Data
US 2024/0334551 A1     Oct. 3, 2024

Related U.S. Application Data

(63) Continuation of application No. PCT/US2023/016726, filed on Mar. 29, 2023.

(51) Int. Cl.
*H05B 1/02* (2006.01)
*F24H 1/18* (2022.01)
(Continued)

(52) U.S. Cl.
CPC .......... *H05B 1/0244* (2013.01); *F24H 1/185* (2013.01); *H01C 13/02* (2013.01); *H05B 3/82* (2013.01);
(Continued)

(58) Field of Classification Search
None
See application file for complete search history.

(56) References Cited

U.S. PATENT DOCUMENTS 1,703,532 A * 2/1929 Hynes ............... H05B 3/78
219/536
1,985,830 A * 12/1934 Powers ............. F24H 1/102
392/471
(Continued)

FOREIGN PATENT DOCUMENTS

CN    203349482 U    12/2013
CN    212499912 U    2/2021
(Continued)

OTHER PUBLICATIONS

PCT International Search Report of International Search Authority (USPTO) in PCT/US2023/016726, filed on Mar. 29, 2023, mailed on Oct. 2, 2023.
(Continued)

*Primary Examiner* — Thor S Campbell
(74) *Attorney, Agent, or Firm* — Basil M. Angelo; ANGELO IP

(57) ABSTRACT

An electric braking resistor-based heat generator for process fluids or emulsions includes a housing having a connection end, a body portion, and a closed end, where at least part of the housing forms an at least partially enclosed portion, an electric braking resistor at least partially disposed within the enclosed portion of the housing, and a thermally conductive material disposed within the enclosed portion of the housing that provides thermal communication between the electric braking resistor and the housing. The electric braking resistor converts electrical energy provided by an electric power source into thermal energy that is thermally communicated from the housing to the process fluids or emulsions.

20 Claims, 21 Drawing Sheets

(51) Int. Cl.
*H01C 13/02* (2006.01)
*H05B 3/82* (2006.01)
(52) U.S. Cl.
CPC .. *H05B 2203/007* (2013.01); *H05B 2203/021* (2013.01)

(56) References Cited

U.S. PATENT DOCUMENTS

| | | | | |
|---|---|---|---|---|
| 3,794,898 | A * | 2/1974 | Gross | H02P 3/22 |
| | | | | 318/762 |
| 4,264,826 | A | 4/1981 | Ullmann | |
| 6,081,086 | A * | 6/2000 | Roth-Stielow | B60L 7/10 |
| | | | | 318/803 |
| 7,832,484 | B2 * | 11/2010 | Nguyen | E21B 36/04 |
| | | | | 166/302 |
| 8,499,874 | B2 * | 8/2013 | Dewis | B60K 6/12 |
| | | | | 180/65.265 |
| 2004/0149160 | A1 | 8/2004 | Foesel et al. | |
| 2007/0144800 | A1 * | 6/2007 | Stone | B60L 7/22 |
| | | | | 180/65.31 |
| 2010/0014219 | A1 | 1/2010 | Strack et al. | |
| 2010/0288571 | A1 | 11/2010 | Dewis et al. | |
| 2012/0148220 | A1 * | 6/2012 | Koga | F24H 1/102 |
| | | | | 392/485 |
| 2013/0154523 | A1 * | 6/2013 | Brown | B60L 7/22 |
| | | | | 318/380 |
| 2016/0000262 | A1 * | 1/2016 | Kelly | A47J 31/542 |
| | | | | 392/478 |
| 2020/0161029 | A1 * | 5/2020 | Rao | F16D 63/002 |
| 2020/0251259 | A1 | 8/2020 | Rao et al. | |
| 2023/0126729 | A1 * | 4/2023 | Rahm | B60W 10/30 |
| | | | | 701/22 |
| 2023/0154655 | A1 * | 5/2023 | Audhav | H05B 3/42 |
| | | | | 338/53 |

FOREIGN PATENT DOCUMENTS

| | | |
|---|---|---|
| CN | 212737773 U | 3/2021 |
| CN | 213025612 U | 4/2021 |
| EP | 0872853 A1 | 10/1998 |
| EP | 1902944 A2 | 3/2008 |
| EP | 3501078 A1 | 6/2019 |
| KR | 20160000185 A | 1/2016 |
| KR | 20160141531 A | 12/2016 |
| WO | 2019062870 A1 | 4/2019 |

OTHER PUBLICATIONS

PCT Written Opinion of International Search Authority (USPTO) in PCT/US2023/016726, filed on Mar. 29, 2023, mailed on Oct. 2, 2023.
Unknown, Cressall Resistors Marine & Offshore Resistor Arrangements, obtained from URL https://www.cressall.com/applications/dynamic-braking-for-marine-offshore/ on May 10, 2022.
Unknown, Post Glover Dynamic Braking Resistors for Variable Frequency Drives, obtained from https://www.postglover.com/download/dynamic-braking-brochure/?wpdmdl=11974 on Mar. 29, 2023.
Unknown, Post Glover Dynamic Braking Resistors Tech Sheet, obtained from https://www.postglover.com/download/dynamic-braking-resistors-tech-sheet-features-and-application-examples/?wpdmdl=11351 on Mar. 29, 2023.
Unknown, Post Glover Neutral Grounding Resistors Technical Information, obtained from https://www.postglover.com/download/neutral-grounding-resistors-technical-information/?wpdmdl=11302 on Mar. 29, 2023.

* cited by examiner

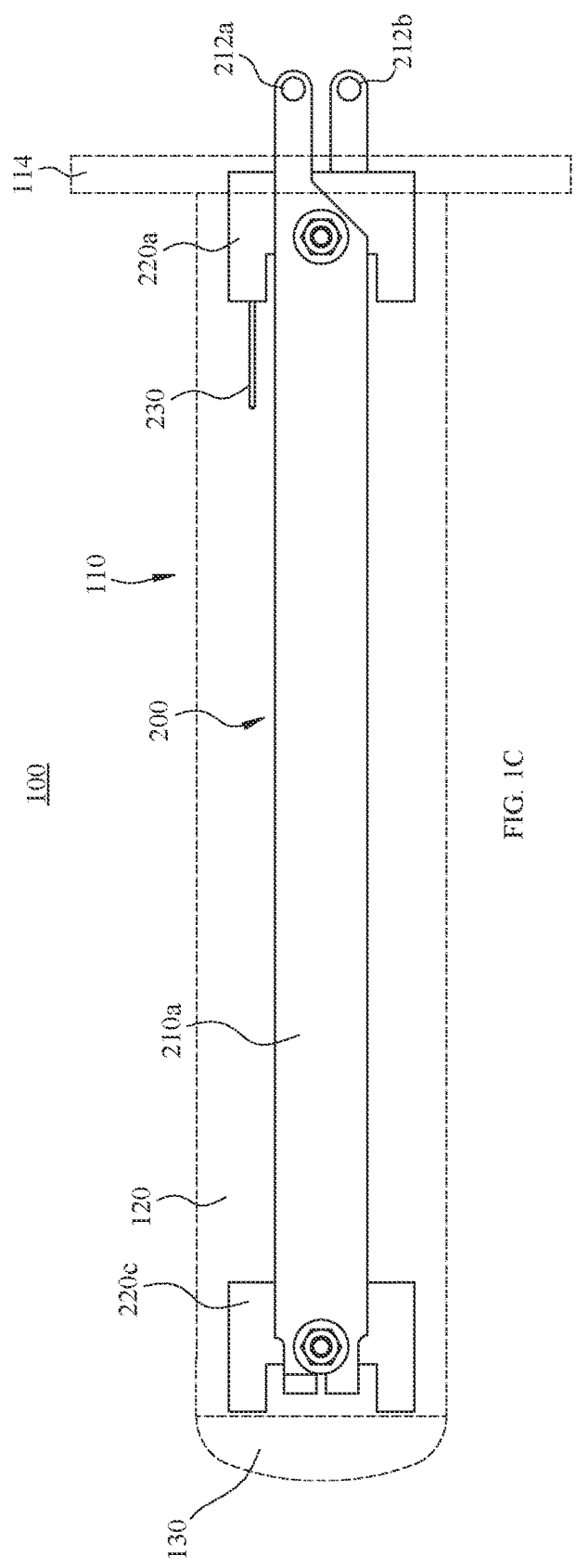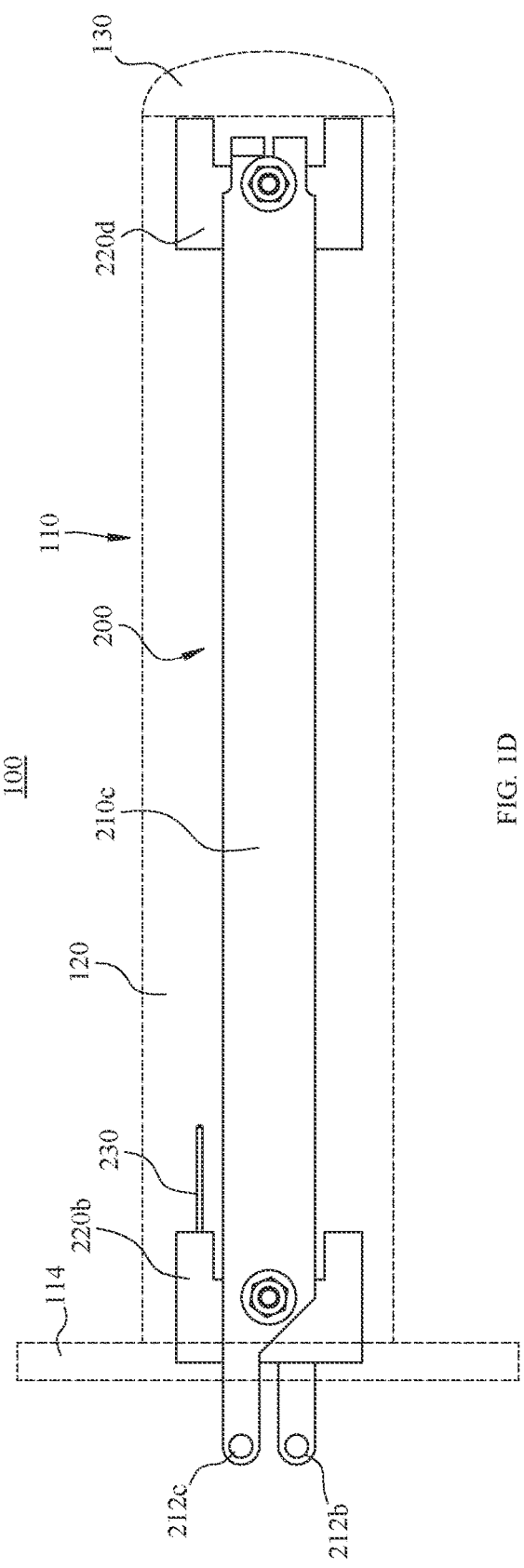
FIG. 1C
FIG. 1D

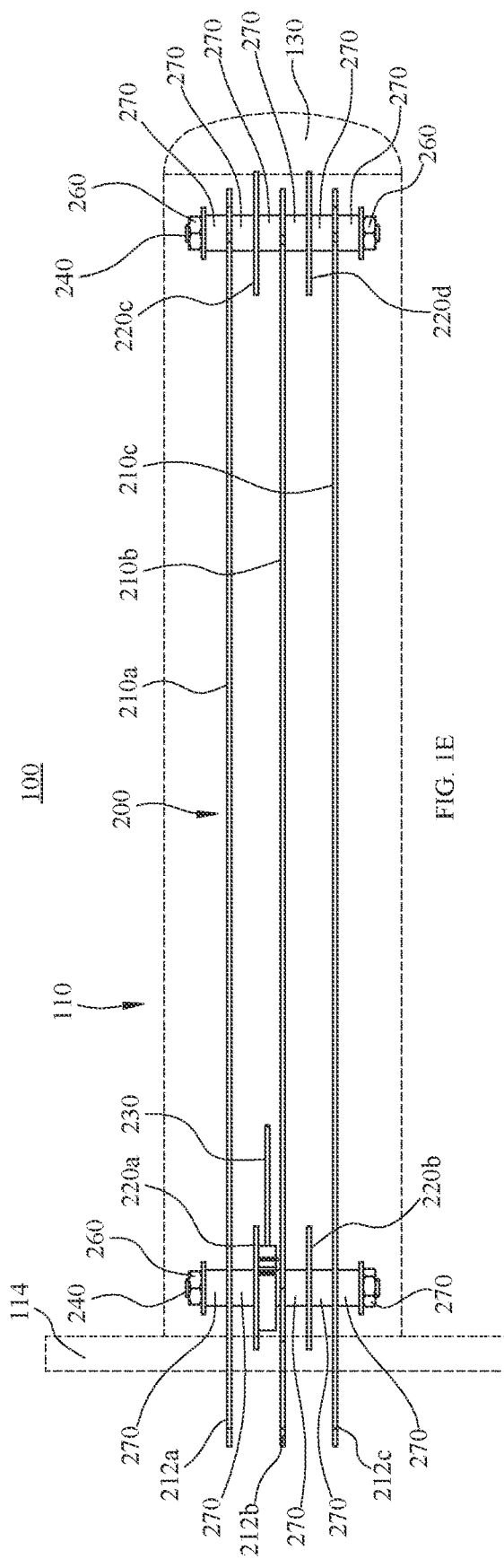
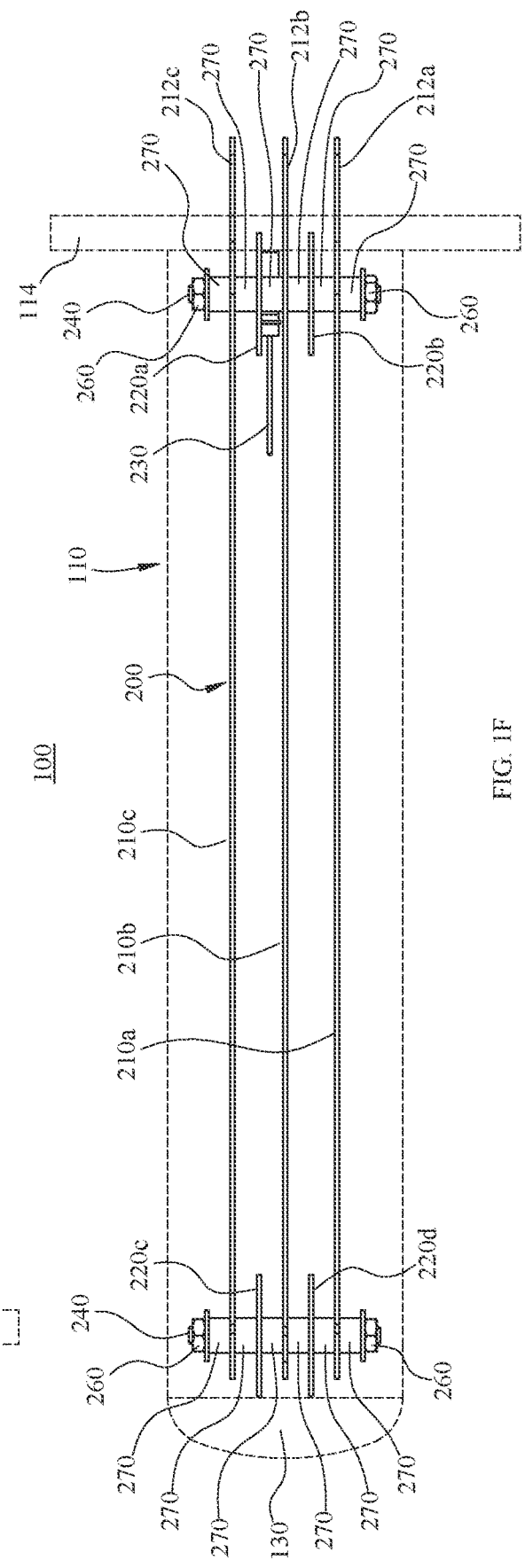

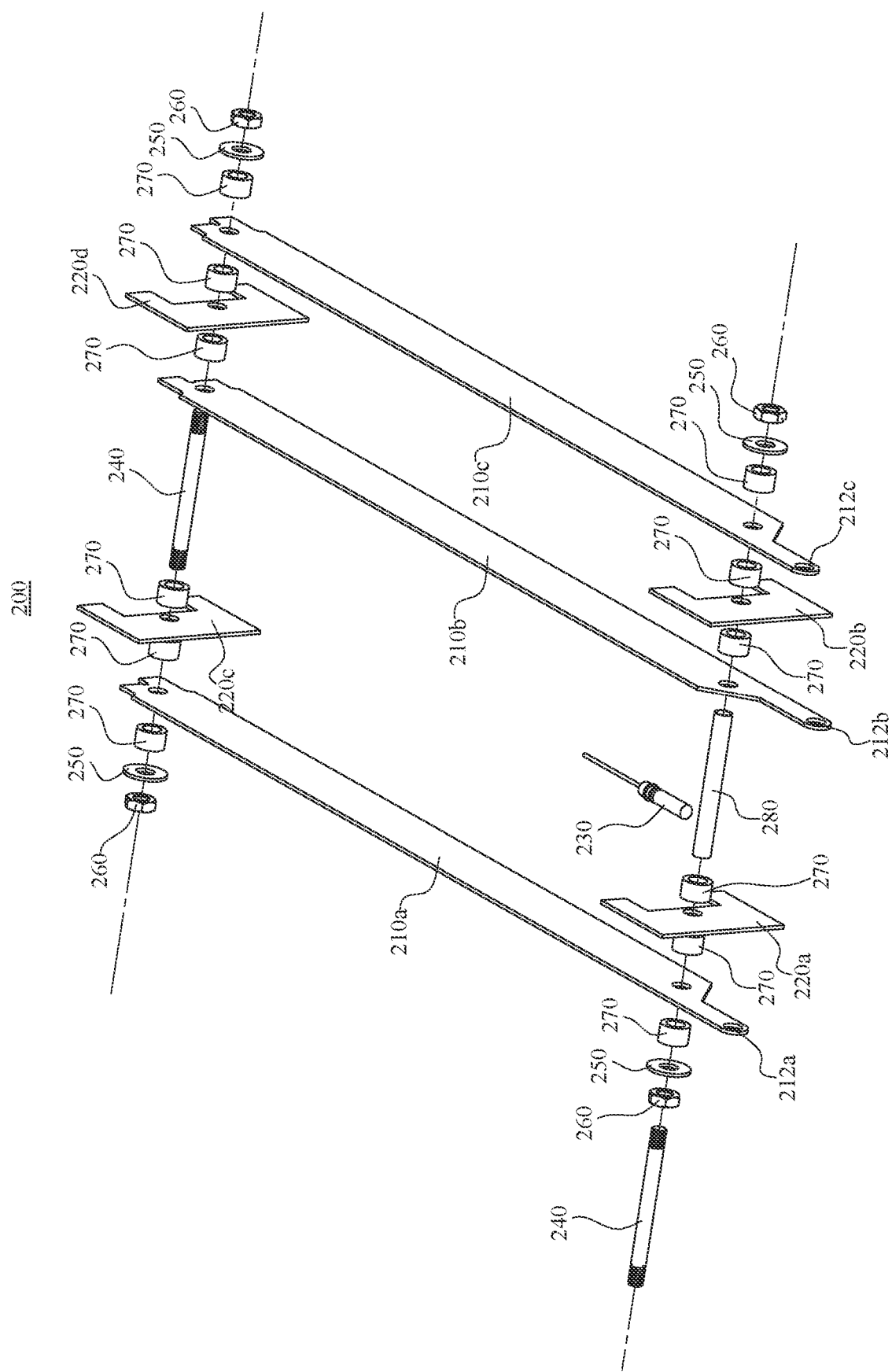

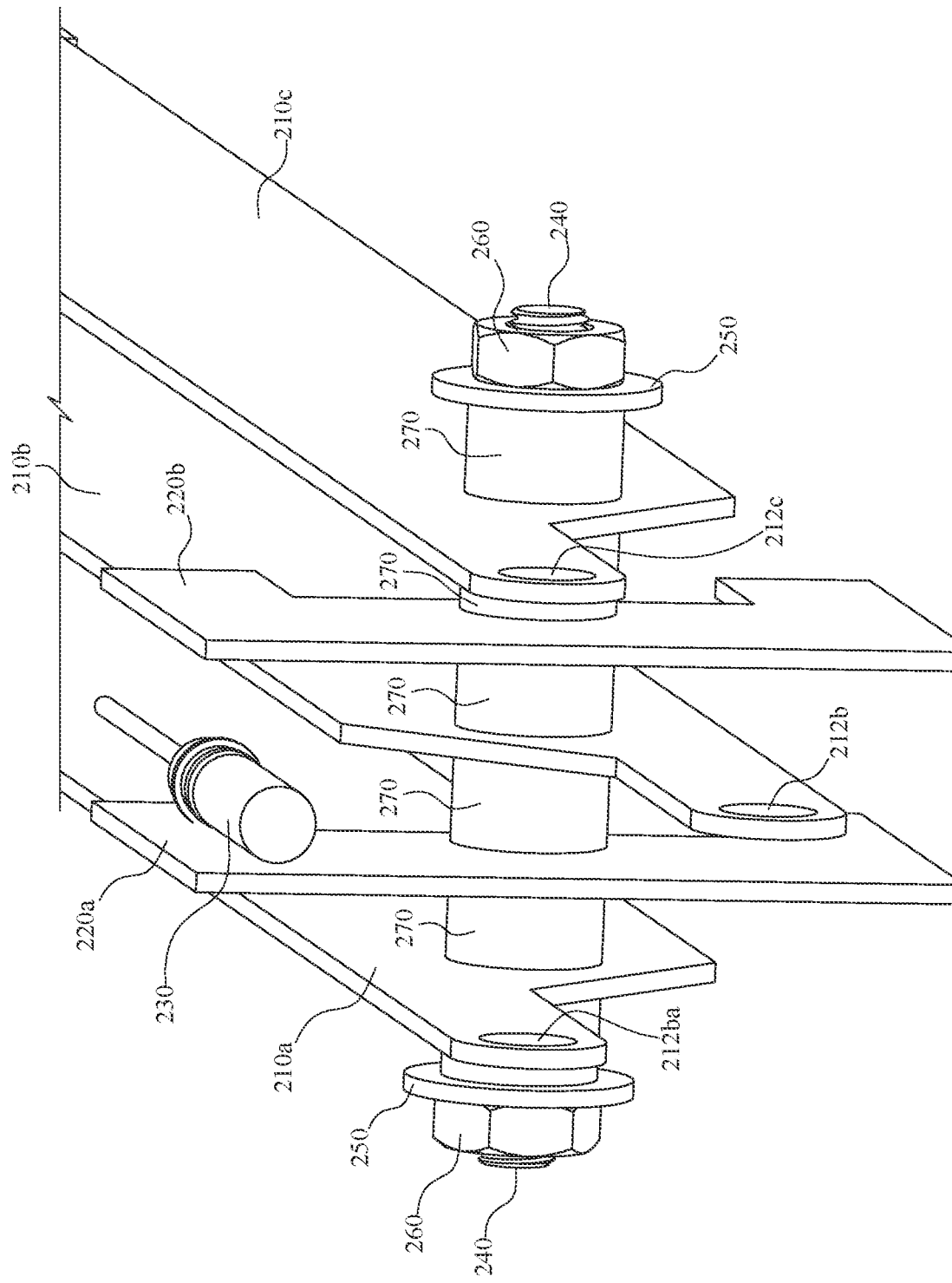

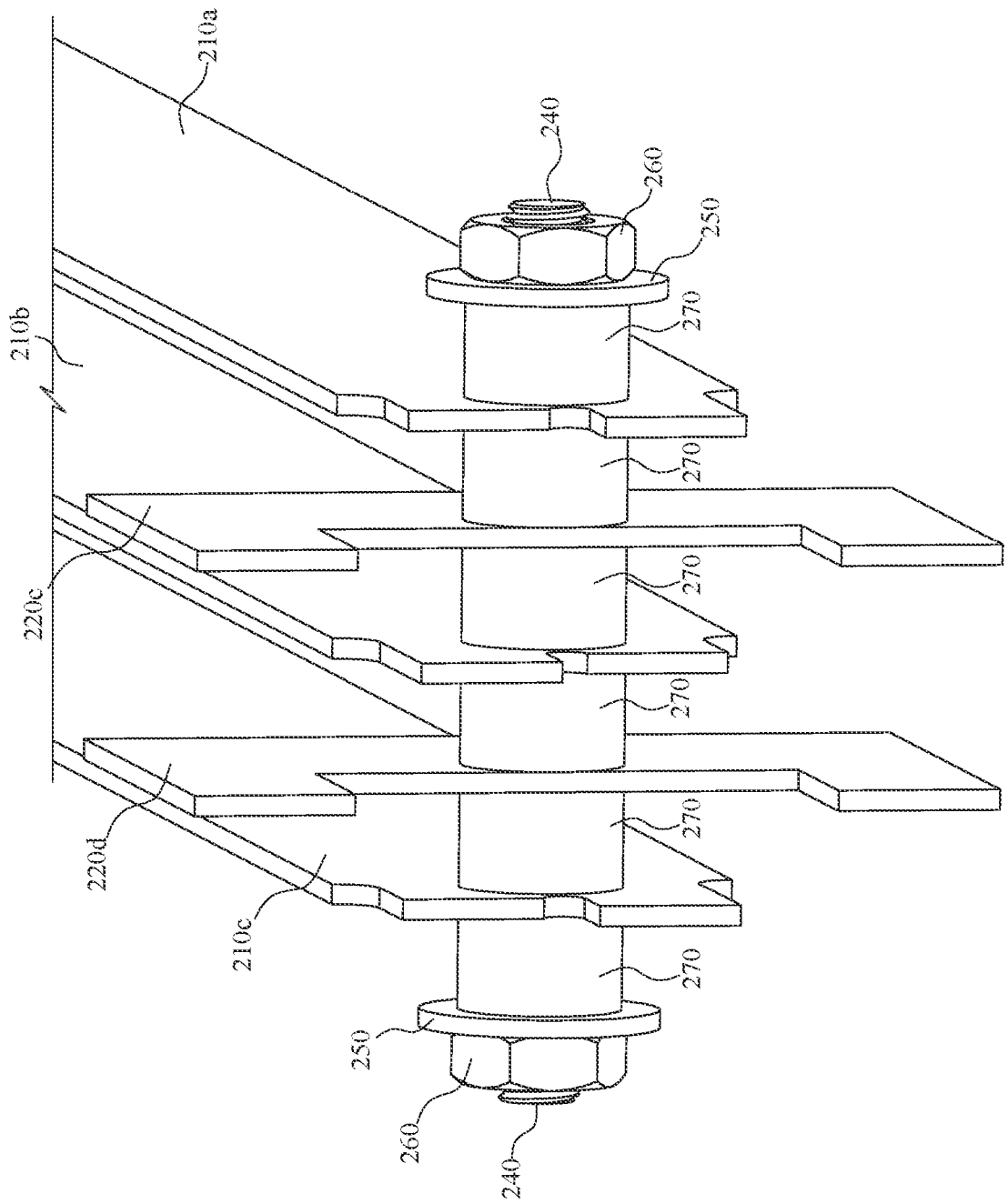

ELECTRIC BRAKING RESISTOR-BASED HEAT GENERATOR FOR PROCESS FLUIDS AND EMULSIONS

CROSS-REFERENCE TO RELATED APPLICATIONS

This application is a continuation of PCT International Application PCT/US2023/016726, filed on Mar. 29, 2023, which claims the benefit of, or priority to, U.S. Provisional Patent Application Ser. No. 63/343,761, filed on May 19, 2022, both of which are hereby incorporated by reference in their entirety for all purposes.

BACKGROUND OF THE INVENTION

Process heaters are used in commercial or industrial processes to convert the chemical energy of a fuel source into thermal energy that is used to heat viscous process fluids or emulsions. Conventional process heaters are used in a wide variety of applications including, but not limited to, heater treaters, heated separators, condensate stabilizers, indirect line heaters, glycol reboiler dehydration systems, and storage tank heaters. The most commonly used types of process heaters include natural draft burner-based fire tubes and immersion heaters.

A natural draft burner-based fire tube is a type of gas-fueled burner that is used to generate a flame that is directed into a fire tube. A portion of the fire tube is disposed within a vessel and thermally communicates heat from the fire tube to the fluids disposed therein. A natural draft burner-based fire tube uses air, a gas fuel source, and combustion to generate heat. The airflow required to maintain the flame is generated through combustion of the air-gas mixture, pressure differentials, and natural drafting, rather than requiring the forced injection of air (e.g., forced-draft burners). Natural draft burner-based fire tubes are comparatively inexpensive, typically include few or no moving parts, require minimal maintenance, and typically do not require power, fans, or blowers. As such, natural draft burner-based fire tubes are commonly used in commercial and industrial applications.

Immersion heaters are the primary alternative to natural draft burner-based fire tubes and use electrically powered heating elements that are placed in direct contact with, or immersed within, the process fluids or emulsions to be heated.

SUMMARY OF THE INVENTION

According to one aspect of one or more embodiments of the present invention, an electric braking resistor of an electric-braking resistor-based heat generator for process fluids or emulsions includes a first braking resistor having a first connection end and a first neutral end, a second braking resistor having a second connection end and a second neutral end, and a third braking resistor having a third connection end and a third neutral end. The first braking resistor, the second braking resistor, and the third braking resistor are electrically arranged in a Wye configuration. The first neutral end, the second neutral end, and the third neutral end are electrically shorted together.

According to one aspect of one or more embodiments of the present invention, an electric braking resistor-based heat generator for process fluids or emulsions includes a housing having a connection end, a body portion, and a closed end, where at least part of the housing forms an at least partially enclosed portion, an electric braking resistor at least partially disposed within the enclosed portion of the housing, and a thermally conductive material disposed within the enclosed portion of the housing that provides thermal communication between the electric braking resistor and the housing. The electric braking resistor converts electrical energy provided by an electric power source into thermal energy that is thermally communicated from the housing to the process fluids.

According to one aspect of one or more embodiments of the present invention, a process fluid heating system using an electric braking resistor-based heat generator includes a vessel for process fluids or emulsions, an electric braking resistor-based heat generator at least partially disposed within the vessel, where the electric braking-resistor-based heat generator includes a housing, an electric braking resistor, and a thermally conductive material. The process fluid heating system also includes an electric power source electrically connected to the electric braking resistor, and a controller that controls the application of electrical energy to the electric braking resistor. The electrical energy is converted into thermal energy that is thermally communicated from the housing to the process fluids within the vessel.

Other aspects of the present invention will be apparent from the following description and claims.

BRIEF DESCRIPTION OF DRAWINGS

FIG. 1C shows a right elevation see-through view of the electric braking resistor-based heat generator in accordance with one or more embodiments of the present invention.

FIG. 1D shows a left elevation see-through view of the electric braking resistor-based heat generator in accordance with one or more embodiments of the present invention.

FIG. 1E shows a top plan see-through view of the electric braking resistor-based heat generator in accordance with one or more embodiments of the present invention.

FIG. 1F shows a bottom see-through view of the electric braking resistor-based heat generator in accordance with one or more embodiments of the present invention.

FIG. 2C shows an exploded perspective view of the electric braking resistor of the electric braking resistor-based heat generator in accordance with one or more embodiments of the present invention.

FIG. 2D shows a detailed front perspective view of the electric braking resistor of the electric braking resistor-based heat generator in accordance with one or more embodiments of the present invention.

FIG. 2F shows a detailed rear perspective view of the electric braking resistor of the electric braking resistor-based heat generator in accordance with one or more embodiments of the present invention.

DETAILED DESCRIPTION OF THE INVENTION

Figure 1A:
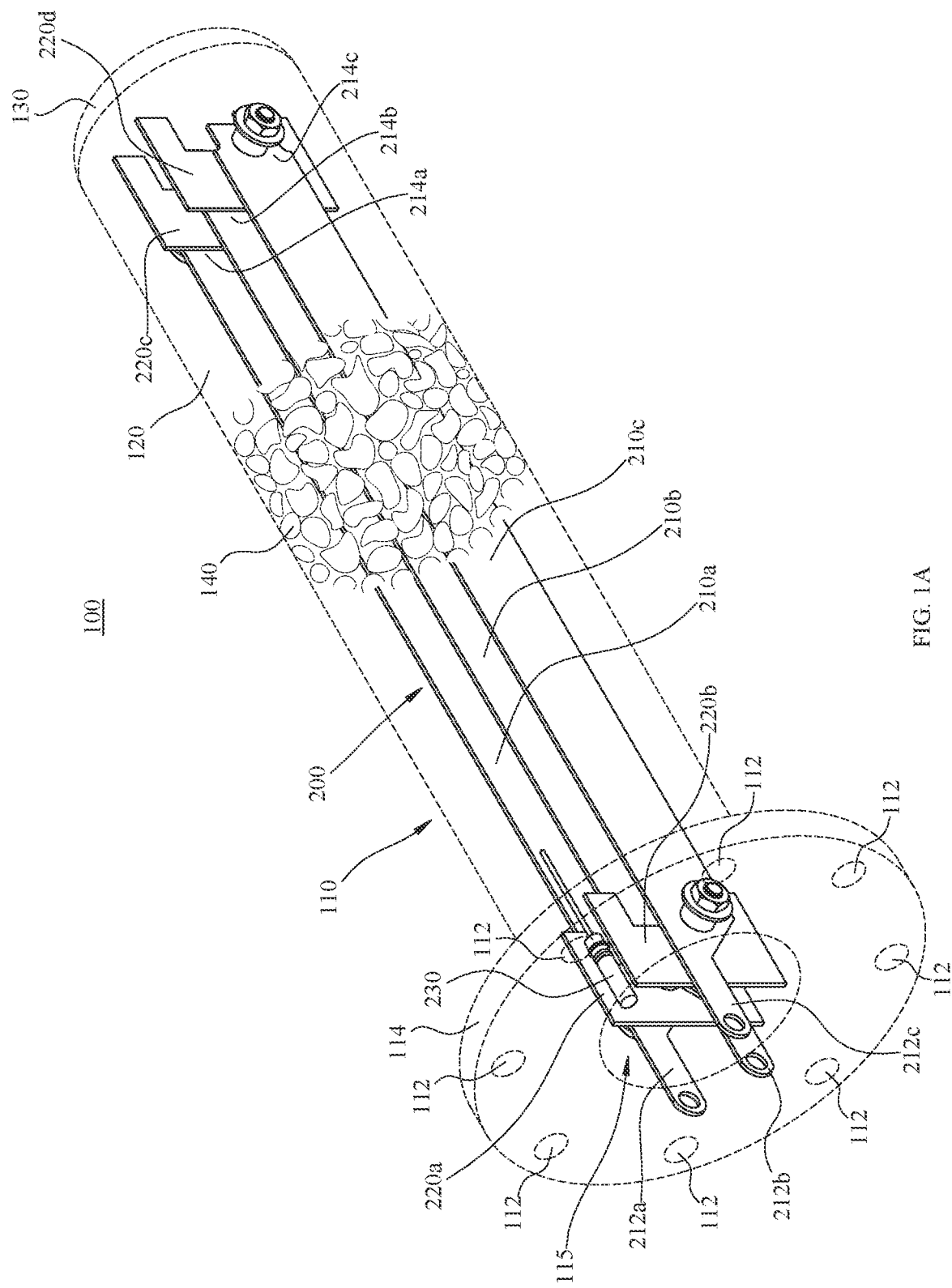
FIG. 1A shows a front-facing see-through perspective view of an electric braking resistor-based heat generator in accordance with one or more embodiments of the present invention.

One or more embodiments of the present invention are described in detail with reference to the accompanying figures. For consistency, like elements in the various figures are denoted by like reference numerals. In the following detailed description of the present invention, specific details are described to provide a thorough understanding of the present invention. In other instances, aspects that are well-known to those of ordinary skill in the art are not described to avoid obscuring the description of the present invention.

For the purpose of this disclosure, fluid refers to liquid, gas, or combinations thereof. A process fluid refers to a fluid that is used in a commercial or industrial process to perform a specific function, such as, for example, heat transfer, lubrication, or chemical reaction. An emulsion is a mixture of two immiscible liquids, where one liquid is dispersed throughout the other in the form of small droplets. For example, in the petroleum industry, heater treater emulsion is a type of oil and water emulsion that is commonly used to enhance oil recovery.

While natural draft burner-based fire tubes and immersion heaters are the most common types of process heaters used for commercial and industrial applications, they pose a number of health, safety, and environmental concerns and suffer from a number of practical and financial limitations.

In a natural draft burner-based fire tube, the characteristics and stability of the flame influence the combustion efficiency. The inability to fully manage excess oxygen and stack-exit temperature results in a significant amount of gas that does not combust. In fact, conventional natural draft burner-based fire tubes are typically only 60-65% efficient, where the remaining 35-40% of the air-gas mixture is released directly into the atmosphere. And in some cases, where the gas is a high British Thermal Unit ("BTU") concentration, as much as 70% of the harmful gases are released directly into the atmosphere. The key to reducing emissions in natural draft burner-based fire tubes is to increase the combustion efficiency, but modern designs rarely exceed 75% efficiency, meaning that despite best efforts at least 25% of the harmful gases are being released directly into the atmosphere. Further, while natural draft burner-based fire tubes are typically powered by natural gas, in the oil and gas industry, the natural gas is typically taken directly from the wellhead on site. However, this gas typically includes a mixture of one or more of methane, ethane, carbon dioxide, and potentially other dangerous gases that are harmful when released into the atmosphere and potentially explosive.

While immersion heaters do not suffer from the emissions problem of natural draft burner-based fire tubes, the fact that the heating element is immersed directly in the process fluids presents a number of challenges. In addition to common oxidation, scale buildup, and related wear and tear resulting from direct contact, immersion heaters are substantially more costly than natural draft burner-based fire tubes. Because of the direct contact with process fluids, the types and kinds of metals and metal alloys that may be used to form the heating elements, as well as their required thicknesses, substantially increase costs and despite best efforts that experience significant wear and tear from use. Notwithstanding, immersion heaters are not always a practicable alternative to natural draft burner-based fire tubes because they cannot be placed directly in emulsions frequently encountered in commercial and industrial processes. To date, there is no conventional process heater suitable for use in commercial or industrial applications that is free from harmful emissions to the environment, that does not require the use of a dangerous flame or combustion, and that does not require direct contact between the heating elements and the process fluids or emulsions.

Accordingly, in one or more embodiments of the present invention, an electric braking resistor-based heat generator for process fluids or emulsions uses an electrically powered braking resistor as the heat source. While electric braking resistors are conventionally used to rapidly discharge high voltages by converting electrical energy into thermal energy, the electric braking resistor-based heat generator purposefully sinks power into the electric braking resistor for the sole purpose of generating heat that may be thermally communicated to the process fluids or emulsions. Advantageously, an electric braking resistor-based heat generator uses a heat source that is electrically powered, does not require gas-based fuel, does not require a flame, and does not create any harmful emissions. Further, an electric braking resistor-based heat generator uses a heat source that is physically isolated from the process fluids or emulsions, may be disposed directly in emulsions, and is highly efficient in converting electrical energy into thermal energy. In addition, an electric braking resistor-based heat generator requires fewer parts, is easier to operate and maintain, and costs less to operate and maintain than conventional heat generators.

In industrial applications of alternating current ("AC") motors, including variable frequency drives ("VFDs") commonly used in the oil and gas industry, rapid braking can cause a freewheeling motor to act as a generator. This freewheeling condition forces some voltage back into the drive, which may cause an overload condition if the energy is not dissipated elsewhere. Electric braking resistors were designed to rapidly absorb a large amount of energy that is generated by the freewheeling motor and dissipate that energy in the form of heat. In one or more embodiments of the present invention, an electric braking resistor may be adapted for use as an intentional heating element for an electric braking resistor-based heat generator.

FIG. 1A shows a front-facing see-through perspective view of an electric braking resistor-based heat generator 100 in accordance with one or more embodiments of the present invention. Electric braking resistor-based heat generator 100 may comprise a housing 110 having a connection end (e.g., 114), a body portion 120, and a closed end 130, where at least part of the housing 110 forms an at least partially enclosed portion (with respect to body portion 120 and closed end 130). In certain embodiments, the connection end of housing 110 may comprise a flange plate 114 having a plurality of flange mounting holes 112 and a flange lumen 115 that provides access to the enclosed portion of housing 110. However, one or ordinary skill in the art will recognize that the type or kind of connection end (e.g., 114) may vary based on an application or design in accordance with one or more embodiments of the present invention. In certain embodiments, housing 110 may be composed of 304 stainless steel. In other embodiments, housing 110 may be composed of 316 stainless steel. In still other embodiments, housing 110 may be composed of Hastelloy® by Haynes International, Inc. In still other embodiments, housing 110 may be composed of Inconel® by Special Metals Corporation. One of ordinary skill in the art will recognize that housing 110 may be composed of any type or kind of metal or metal alloys that are thermally conductive, suitable to be at least partially disposed within a vessel, and capable of thermally communicating heat in accordance with one or more embodiments of the present invention.

An electric braking resistor 200 may be at least partially disposed within the enclosed portion of housing 110 (e.g., 120 and 130). Electric braking resistor 200 may include one or more resistors that convert electrical energy into thermal energy. In certain embodiments, electric braking resistor 200 may comprise three braking resistors (e.g., 210a, 210b, and 210c) electrically arranged in a conventional Wye configuration for use with a three-phase electric power source (not shown). In such embodiments, a first braking resistor 210a may have a first connection end 212a and a first neutral end (e.g., 214a), a second braking resistor 210b may have a second connection end 212b and a second neutral end (e.g., 214b), and a third braking resistor 212c may have a third connection end 212c and a third neutral end (e.g., 214c).

First braking resistor 210a, second braking resistor 210b, and third braking resistor 210c may be electrically arranged in a conventional Wye configuration. In the Wye configuration, the first neutral end (e.g., 214a) of first braking resistor 210a, the second neutral end (e.g., 214b) of second braking resistor 210b, and the third neutral end (e.g., 214c) of third braking resistor 210c may be electrically shorted together, forming the neutral node of the Wye configuration. First connection end 212a of first braking resistor 210a, second connection end 212b of second braking resistor 210b, and third connection end 212c of third braking resistor 210c may serve as the three-phase connection points of the Wye configuration and may be accessible through, for example, flange lumen 115 of flange 114 of housing 110.

In other embodiments, electric braking resistor 200 may comprise three braking resistors (e.g., 210a, 210b, and 210c) electrically arranged in a conventional Delta configuration (not shown) for use with a three-phase electric power source (not shown). In such embodiments, a first braking resistor 210a may have two connection ends 212a and 214a, a second braking resistor 210b may have two connection ends 212b and 214b, and a third braking resistor 212c may have two connection ends 212c and 214c. First braking resistor 210a, second braking resistor 210b, and third braking resistor 210c may be electrically arranged in a conventional Delta configuration (not shown). In the Delta configuration, each connection end (e.g., 212a, 214a, 212b, 214b, 212c, and 214c) of each braking resistor (e.g., 210a, 210b, and 210c) may be electrically connected to a connection end (e.g., 212a, 214a, 212b, 214b, 212c, and 214c) of another braking resistor (e.g., 210a, 210b, and 210c), forming the conventional Delta configuration. Each of first connection end 212a of first braking resistor 210a, second connection end 212b of second braking resistor 210b, and third connection end 212c of third braking resistor 210c may serve as the three-phase connection points of the Delta configuration and may be accessible through, for example, flange lumen 115 of flange 114 of housing 110.

One of ordinary skill in the art having the benefit of this disclosure will recognize that other configurations of one or more braking resistors may be used, based on an application or design, in accordance with one or more embodiments of the present invention.

A thermally conductive material 140 may be disposed within the enclosed portion of housing 110, surrounding electric braking resistor 200, that provides thermal communication between electric braking resistor 200 and housing 110. While thermally conductive material 140 is only shown in a portion of the drawing, so as to not obscure details, one of ordinary skill in the art will appreciate that the thermally conductive material 140 substantially fills the enclosed portion of housing 110, surrounding electric braking resistor 200, and thermally connecting electric braking resistor 200 to housing 110. In operative use, electric braking resistor 200 may convert electrical energy provided by an electric power source (not shown) into thermal energy that may be thermally communicated from electric braking resistor 200 to housing 110 to process fluids (not shown) or emulsions (not shown). In certain embodiments, the thermally conductive material 140 may be composed of ground or pelletized quartzite. In other embodiments, the thermally conductive material 140 may be composed of granite. In still other embodiments, the thermally conductive material 140 may be composed of porcelain. One of ordinary skill in the art will recognize that any type or kind of thermally conductive material capable of sufficiently conveying thermal energy from electric braking resistor 200 to housing 110 may be used in accordance with one or more embodiments of the present invention. A thermal sensor 230 may be disposed within the enclosed portion of housing 115 and provide a sensed temperature from within the enclosed portion of housing 115.

Figure 1B:
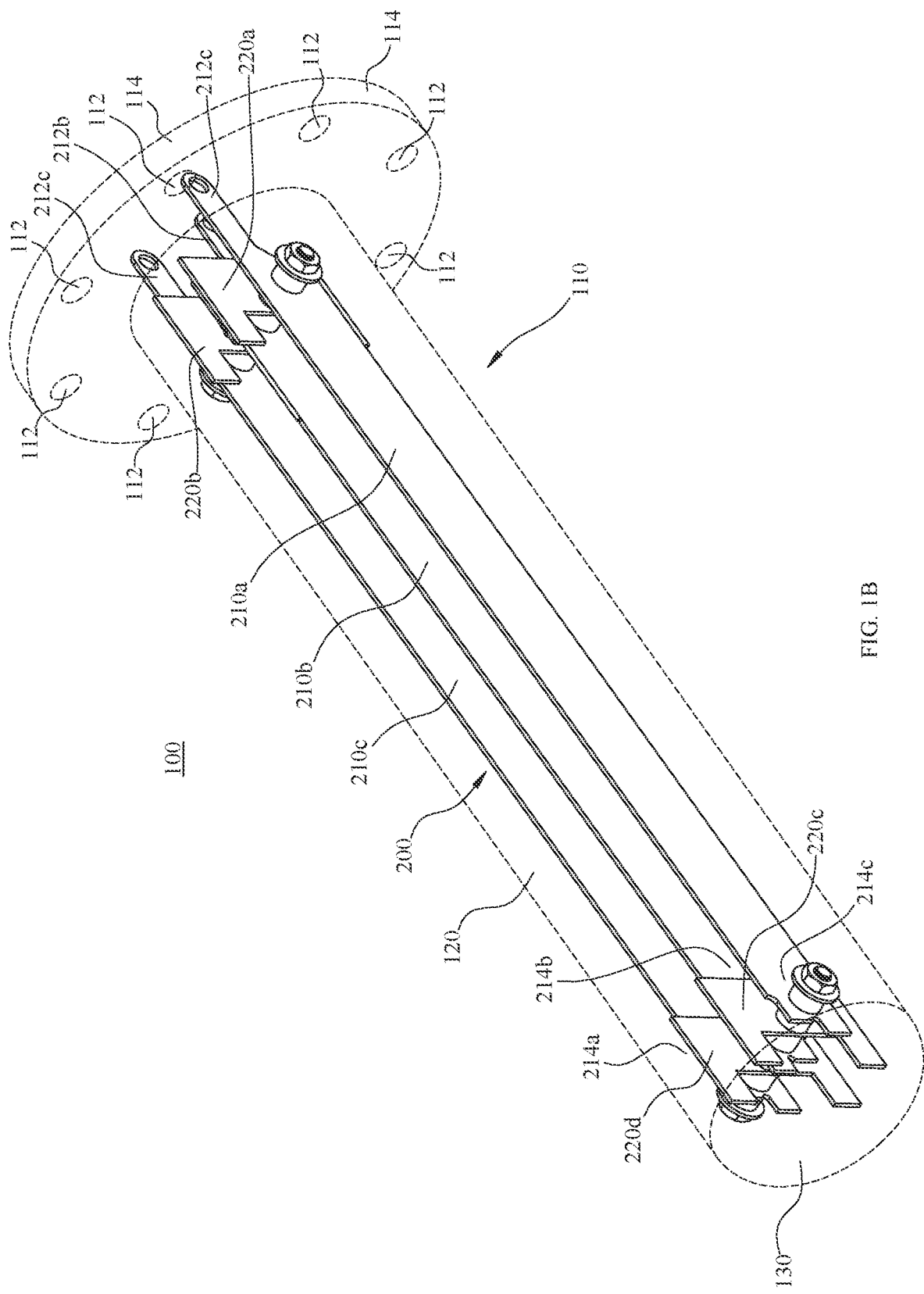
FIG. 1B shows a rear-facing see-through perspective view of the electric braking resistor-based heat generator in accordance with one or more embodiments of the present invention.

Continuing, FIG. 1B shows a rear-facing see-through perspective view of electric braking resistor-based heat generator 100 in accordance with one or more embodiments of the present invention. As shown in this view, a substantial portion of electric braking resistor 200 may be disposed within the enclosed portion of housing 110, formed by body portion 120 and closed end 130. The thermally conductive material (140, not shown) may be disposed between electric braking resistor 200 and the enclosed portion of housing 110, such that electric braking resistor 200 may thermally communicate with housing 110. At least a portion of the enclosed portion of housing 110 may be disposed in a vessel (not shown) and thermally communicate thermal energy from housing 110 to process fluids (not shown) or emulsions (not shown) disposed within the vessel (not shown).

Continuing, FIG. 1C shows a right elevation see-through view of electric braking resistor-based heat generator 100 in accordance with one or more embodiments of the present invention. A front support member (e.g., 220a) may be disposed between first braking resistor (e.g., 210a, not shown) and second braking resistor 210b. Similarly, a rear support member (e.g., 220c) may be disposed between first braking resistor (e.g., 210a not shown) and second braking resistor 210b. The front (e.g., 220a) and rear (e.g., 220c) support members may be used to position and provide mechanical support to electric braking resistor 200 within housing 110 and ensure that conductive portions of electric braking resistor 200 are not in electrical contact with conductive portions of housing 110, to prevent housing 110 from becoming energized during operative use. The thermally conductive material (140, not shown) may be disposed within the enclosed portion of housing 110 such that it surrounds electric braking resistor 200 and provides thermal communication between resistor 200 and housing 110.

Continuing, FIG. 1D shows a left elevation see-through view of electric braking resistor-based heat generator 100 in accordance with one or more embodiments of the present invention. A front support member (e.g., 220b) may be disposed between second braking resistor (e.g., 210b, not shown) and third braking resistor 210c. Similarly, a rear support member (e.g., 220d) may be disposed between second braking resistor (e.g., 210b not shown) and third braking resistor 210c. The front (e.g., 220b) and rear (e.g., 220d) support members may be used to position and provide mechanical support to electric braking resistor 200 within housing 110 and ensure that conductive portions of electric braking resistor 200 are not in electrical contact with conductive portions of housing 110, to prevent housing 110 from becoming energized during operative use. The thermally conductive material (140, not shown) may be disposed within the enclosed portion of housing 110 such that it surrounds electric braking resistor 200 and provides thermal communication between resistor 200 and housing 110.

Continuing, FIG. 1E shows a top plan see-through view of electric braking resistor-based heat generator 100 in accordance with one or more embodiments of the present invention. As shown in this view, first connection end 212a of first braking resistor 210a, second connection end 212b of second braking resistor 210b, and third connection end 212c of third braking resistor 210c are accessible through the lumen (e.g., 115, not shown in this view) of the connection end (e.g., 114) of housing 110. When electric braking resistor-based heat generator 100 is at least partially disposed within a vessel (not shown), the connection end (e.g., 114) may be used to secure heat generator 100 in place with respect to the vessel (not shown) and provide a point of connection for the electric power source (not shown).

Continuing, FIG. 1F shows a bottom see-through view of electric braking resistor-based heat generator 100 in accordance with one or more embodiments of the present invention. As shown in this view, each of first braking resistor 210a, second braking resistor 210b, and third braking resistor 210c may be arranged in a substantially parallel manner, which in this instance, facilitates the formation of an electrical Wye configuration. Also as shown in this view, each braking resistor (e.g., 210a, 210b, and 210c) may be secured in place with a plurality of bolts 240, nuts 260, and bushings 270. For the connection end, a non-conductive sheath (not shown) may cover bolt 240 to prevent bolt 240 from electrically shorting together the connection ends (e.g., 212a, 212b, and 212c) of the braking resistors (e.g., 210a, 210b, and 210c). However, for the neutral end, the neutral ends (e.g., 214a, 214b, and 214c) of the braking resistors (e.g., 210a, 210b, and 210c) may be shorted together to form the neutral point of the Wye configuration. As such, a conductive sheath (not shown) may cover bolt 240, or no sheath may be used, such that a conductive bolt 240 may electrically short the braking resistors (e.g., 210a, 210b, and 210c) together. Alternatively, the neutral ends (e.g., 214a, 214b, and 214c) of the braking resistors (e.g., 210a, 210b, and 210c) may be electrically shorted together with an electrical short (not shown).

Figure 1G:
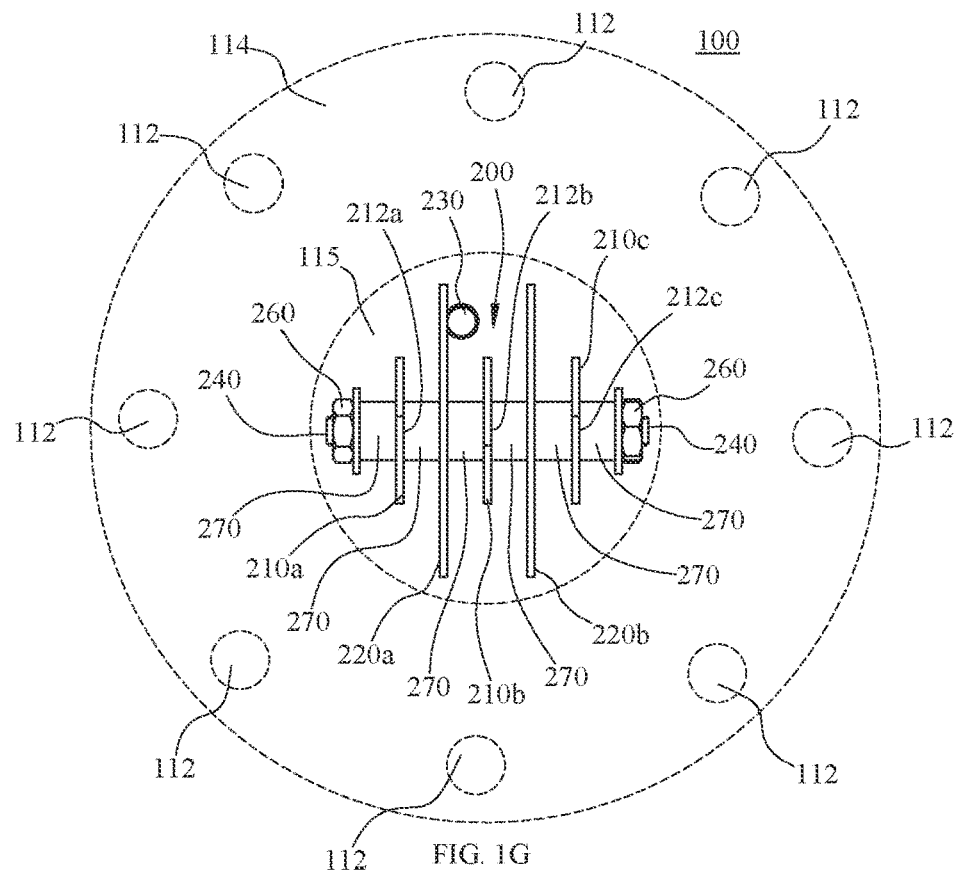
FIG. 1G shows a front elevation see-through view of the electric braking resistor-based heat generator in accordance with one or more embodiments of the present invention.
Figure 1H:
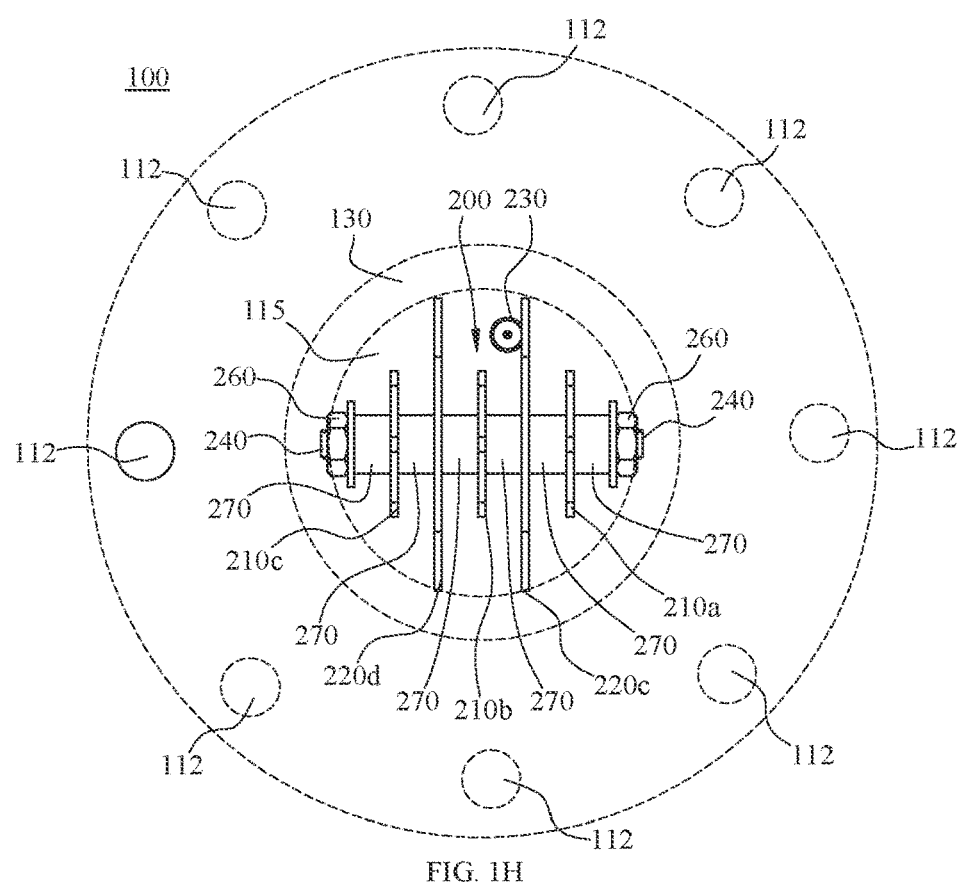
FIG. 1H shows a rear elevation see-through view of the electric braking resistor-based heat generator in accordance with one or more embodiments of the present invention.

Continuing, FIG. 1G shows a front elevation see-through view of electric braking resistor-based heat generator 100 in accordance with one or more embodiments of the present invention. The connection end (e.g., 114) of electric braking resistor-based heat generator 100 may include a flange plate 114 having a flange lumen 115 that provides access to the enclosed portion of housing 110. As shown in this view, first connection end 212a, second connection end 212b, and third connection end 212c may be accessible through lumen 115 and serve as points of connection for the electric power source (not shown). Continuing, FIG. 1H shows a rear elevation see-through view of the electric braking resistor-based heat generator 100 in accordance with one or more embodiments of the present invention.

Figure 2A:
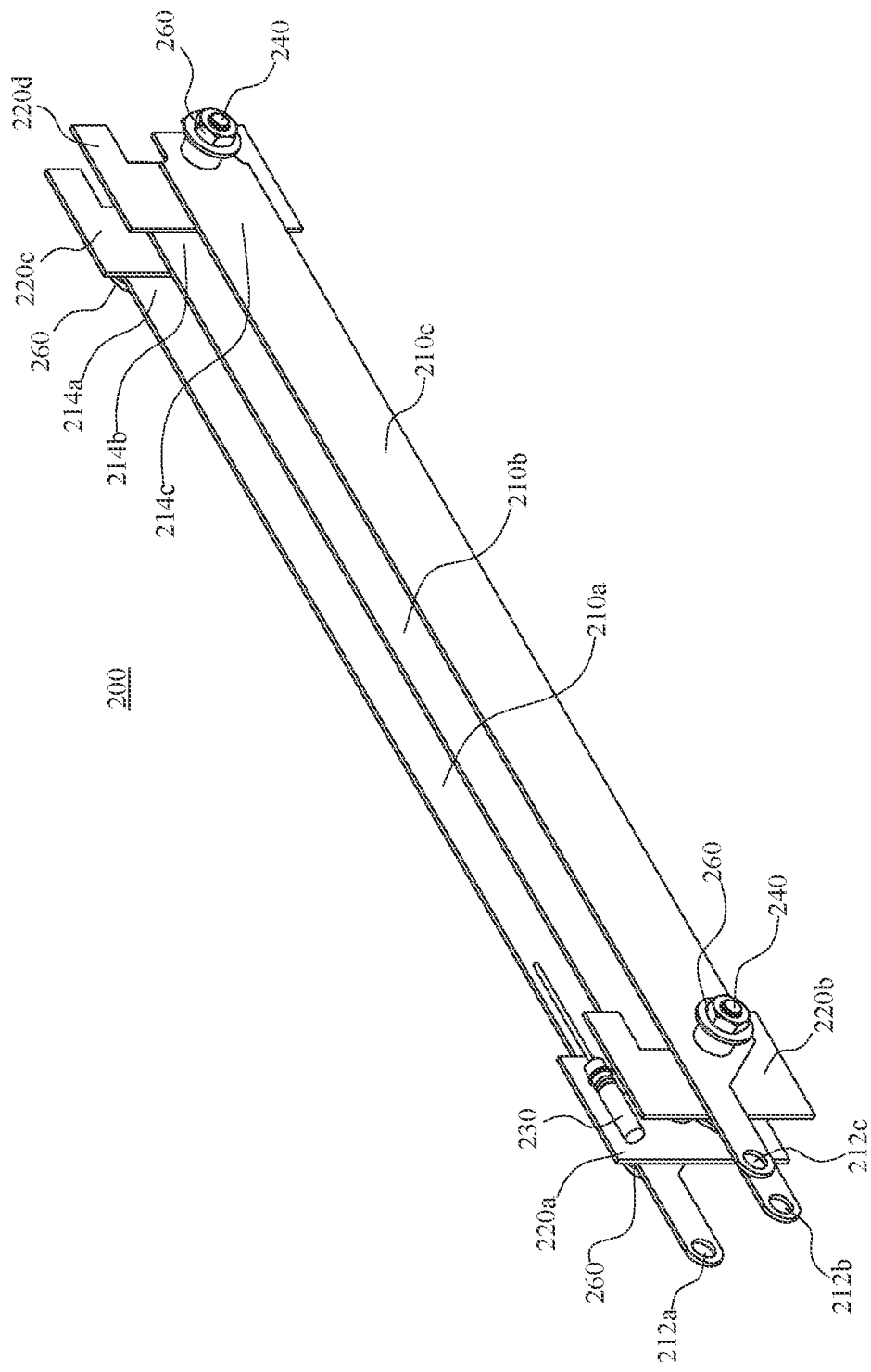
FIG. 2A shows a front-facing perspective view of an electric braking resistor of an electric braking resistor-based heat generator in accordance with one or more embodiments of the present invention.

FIG. 2A shows a front-facing perspective view of an electric braking resistor 200 of an electric braking resistor-based heat generator 100 in accordance with one or more embodiments of the present invention. In certain embodiments, electric braking resistor 200 may comprise one or more plate resistors (e.g., 210a, 210b, and 210c) that each present an electrical resistance between their respective connection end (e.g., 212a, 212b, and 212c) and neutral end (e.g., 214a, 214b, and 214c). In other embodiments, electric braking resistor 200 may comprise one or more steel-grid resistors (not shown) that each present an electrical resistance between their respective connection end (e.g., 212a, 212b, and 212c) and neutral end (e.g., 214a, 214b, and 214c). In still other embodiments, electric braking resistor 200 may comprise one or more ceramic resistors (not shown) that each present an electrical resistance between their respective connection end (e.g., 212a, 212b, and 212c) and neutral end (e.g., 214a, 214b, and 214c). In still other embodiments, electric braking resistor 200 may comprise one or more carbon steel resistors (not shown) that each present an electrical resistance between their respective connection end (e.g., 212a, 212b, and 212c) and neutral end (e.g., 214a, 214b, and 214c). One of ordinary skill in the art will recognize that any type or kind of resistor that presents a suitable electrical resistance, power rating, and meets mechanical requirements for particular application or design may be used in accordance with one or more embodiments of the present invention.

Figure 2B:
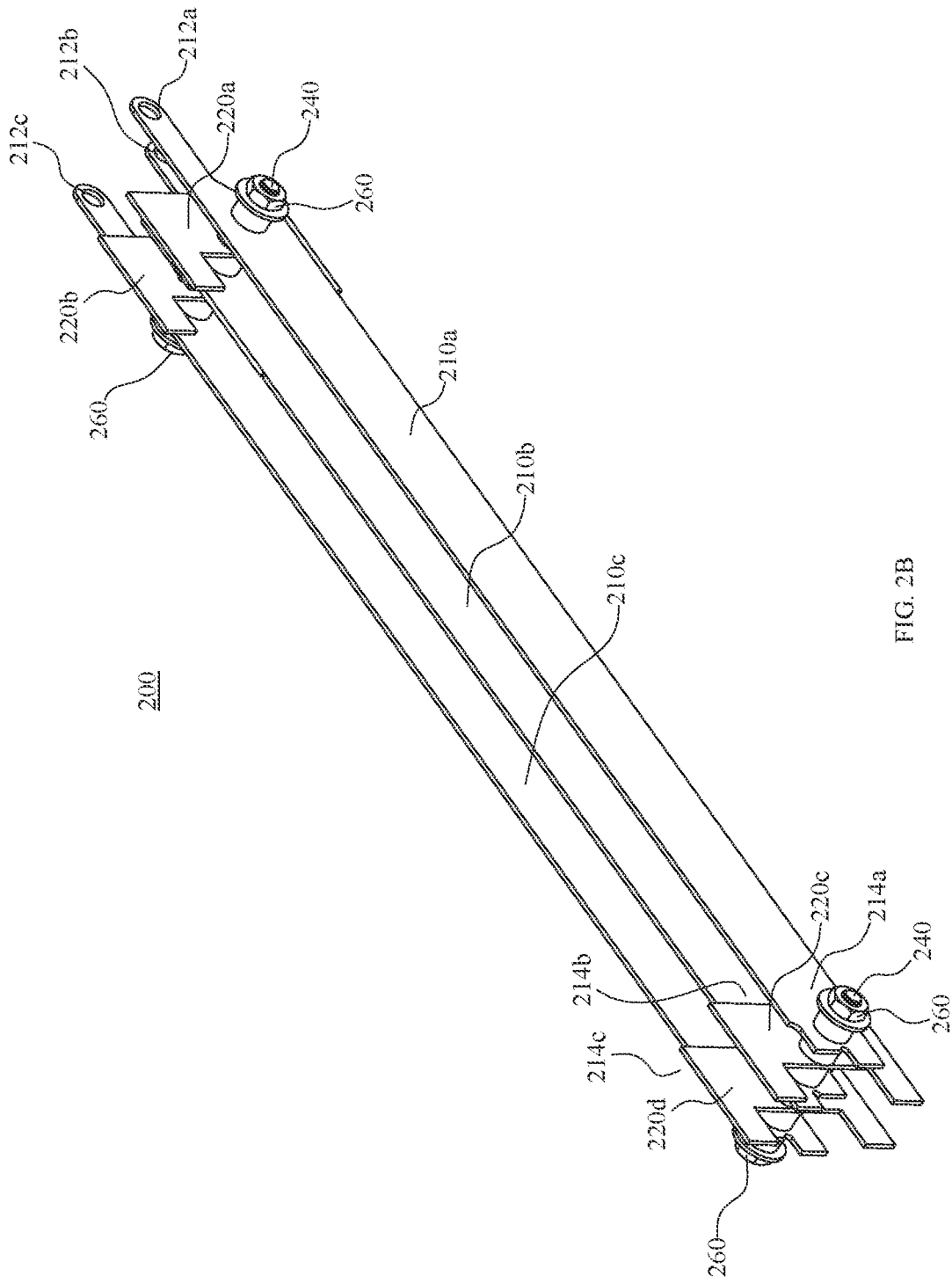
FIG. 2B shows a rear-facing perspective view of the electric braking resistor of the electric braking resistor-based heat generator in accordance with one or more embodiments of the present invention.

Continuing, FIG. 2B shows a rear-facing perspective view of electric braking resistor 200 of electric braking resistor-based heat generator 100 in accordance with one or more embodiments of the present invention. In certain embodiments, each braking resistor (e.g., 210a, 210b, and 210c) may have an electrical resistance in a range between 1 ohm and 20 ohms. In other embodiments, each braking resistor (e.g., 210a, 210b, and 210c) may have an electrical resistance in a range between 2 ohms and 10 ohms. In still other embodiments, each braking resistor (e.g., 210a, 210b, and 210c) may have an electrical resistance in a range between 3 ohms and 5 ohms. One of ordinary skill in the art will recognize that the electrical resistance may vary based on an application or design in accordance with one or more embodiments of the present invention.

In certain embodiments, each braking resistor (e.g., 210a, 210b, and 210c) may have a power rating in a range between 5,000 watts and 50,000 watts. In other embodiments, each braking resistor (e.g., 210a, 210b, and 210c) may have a power rating in a range between 10,000 watts and 40,000 watts. In still embodiments, each braking resistor (e.g., 210a, 210b, and 210c) may have a power rating in a range between 15,000 watts and 30,000 watts. One of ordinary skill in the art will recognize that the power rating may vary based on an application or design in accordance with one or more embodiments of the present invention.

Continuing, FIG. 2C shows an exploded perspective view of electric braking resistor 200 of electric braking resistor-based heat generator 100 in accordance with one or more embodiments of the present invention. As shown in this view, the braking resistors (e.g., 210a, 210b, and 210c) may have a size and a shape suitable for use with a desired housing (e.g., 110 of FIG. 1) for a particular application or design. In the exemplary application depicted, a three-phase electrical Wye configuration may be used to generate and convey sufficient thermal energy for high temperature process fluid/emulsion operations. As such, a plurality of resistors (e.g., 210a, 210b, and 210c) arranged in a parallel orientation may be used to form the electrical Wye configuration. Notwithstanding, the braking resistors (e.g., 210a, 210b, and 210c) may be sized and shaped to fit the desired housing (e.g., 110) and communicate thermal energy in a substantially uniform manner to the housing (e.g., 110). Front support structures (e.g., 220a, 220c) and front mounting hardware may include a bolt 240, a plurality of washers 250, nuts 260, and bushings 270, and a non-conductive sheath 280 that prevents bolt 240 from shorting the connection ends (e.g., 212a, 212b, and 212c) of the braking resistors (e.g., 210a, 210b, and 210c) together. Similarly rear support structures (e.g., 220b, 220d) and rear mounting hardware may include a bolt 240, a plurality of washers 250, nuts 260, and bushings 270. A conductive sheath (not shown) or a conductive bolt 240 itself, may be used to short the neutral ends (e.g., 214a, 214b, and 214c) of braking resistors (e.g., 210a, 210b, and 210c) together, forming the electrical Wye configuration. Alternatively, an electrical short (not shown) may be used to short the neutral ends (e.g., 214a, 214b, and 214c) of braking resistors (e.g., 210a, 210b, and 210c) together.

Figure 2E:
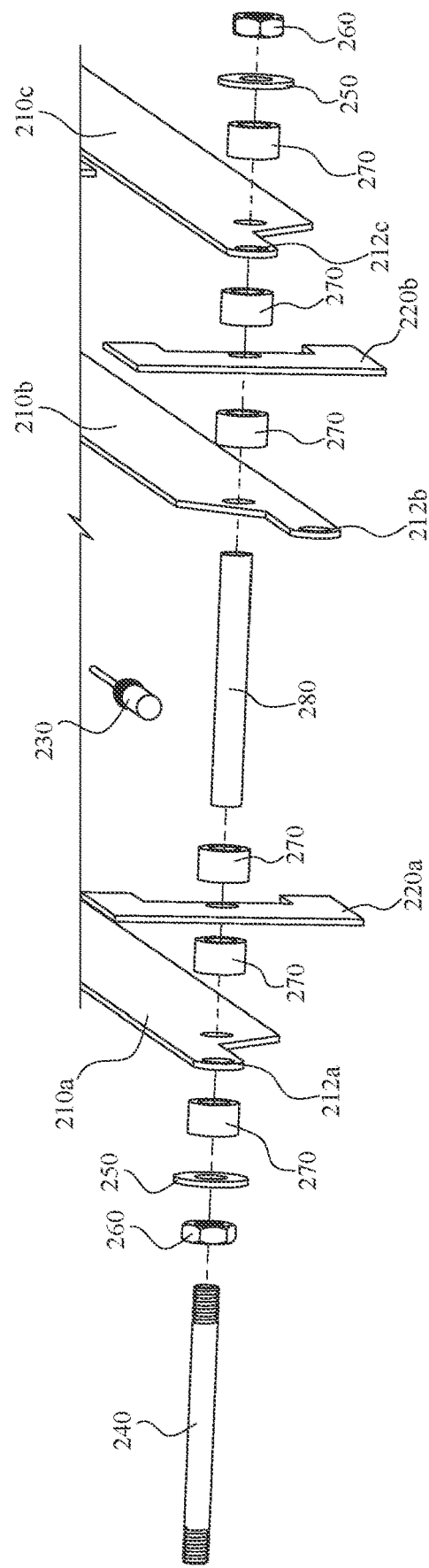
FIG. 2E shows a detailed front exploded view of the electric braking resistor of the electric braking resistor-based heat generator in accordance with one or more embodiments of the present invention.

Continuing, FIG. 2D shows a detailed front perspective view of electric braking resistor 200 of electric braking resistor-based heat generator 100 in accordance with one or more embodiments of the present invention. In this detailed view, the electrical isolation between first connection end 212a of first braking resistor 210a, second connection end 212b of second braking resistor 210b, and third connection end 212c of third braking resistor 210c is shown. A plurality of bushings 270 may be used to space out the electrical components to prevent them from coming into unintended electrical contact with one another. A bolt 240 may be used to secure the connection end of electric braking resistor 200 together in a non-conductive manner. In certain embodiments, a non-conductive sheath (e.g., 280 not shown in this view) may cover bolt 240 and prevent bolt 240 from shorting the first braking resistor 210a, second braking resistor 210b, and third braking resistor 210c together. A plurality of washers 250 and nuts 260 may be used to secure bolt 240 in place. Continuing, FIG. 2E shows a detailed front exploded view of the connection end of electric braking resistor 200 of electric braking resistor-based heat generator 100 suggesting assembly in accordance with one or more embodiments of the present invention.

Figure 2G:
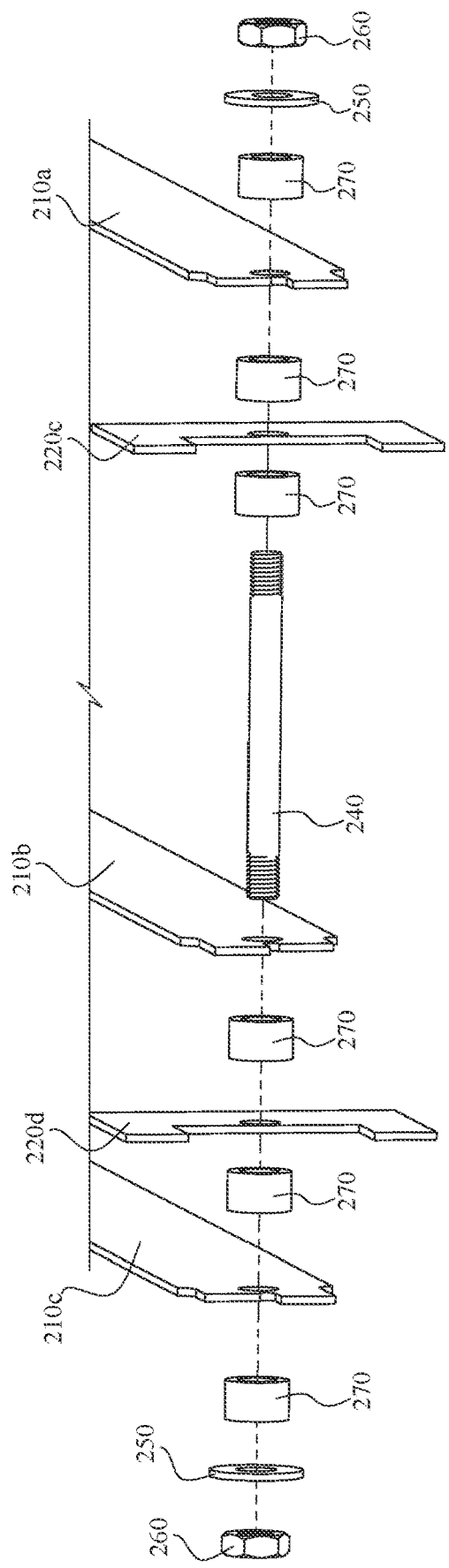
FIG. 2G shows a detailed rear exploded view of the electric braking resistor of the electric braking resistor-based heat generator in accordance with one or more embodiments of the present invention.

Continuing, FIG. 2F shows a detailed rear perspective view of electric braking resistor 200 of electric braking resistor-based heat generator 100 in accordance with one or more embodiments of the present invention. In this detailed view, the electrical shorting between first neutral end 214a of first braking resistor 210a, second neutral end 214b of second braking resistor 210b, and third neutral end 214c of third braking resistor 210c is shown. A plurality of bushings 270 may be used to space out the electrical components to prevent them from coming into unintended electrical contact with one another In certain embodiments, a bolt 240 may be used to secure the neutral end of electric braking resistor 200 together, in a conductive manner. Alternatively, bolt 240 may have a size and shape such that it makes an interference fit with, and electrically shorts, first neutral end 214a of first braking resistor 210a, second neutral end 214b of second braking resistor 210b, and third neutral end 214c of third braking resistor 210c together. In other embodiments, a conductive sheath (not shown) may cover bolt 240 and electrically short first neutral end 214a of first braking resistor 210a, second neutral end 214b of second braking resistor 210b, and third neutral end 214c of third braking resistor 210c together. In still other embodiments, an electrical short (not shown) may be used to electrically short first neutral end 214a of first braking resistor 210a, second neutral end 214b of second braking resistor 210b, and third neutral end 214c of third braking resistor 210c together. In each embodiment, a plurality of washers 250 and nuts 260 may be used to secure bolt 240 in place. Continuing, FIG. 2G shows a detailed rear exploded view of the neutral end of electric braking resistor 200 of electric braking resistor-based heat generator 100 suggesting assembly in accordance with one or more embodiments of the present invention.

In certain embodiments, the resistor (e.g., 210a, 210b, 210c) portion of electric braking resistor 200 may be composed of 304 stainless steel. In other embodiments, the resistor (e.g., 210a, 210b, 210c) portion of electric braking resistor 200 may be composed of 316 stainless steel. In still other embodiments, the resistor (e.g., 210a, 210b, 210c) portion of electric braking resistor 200 may be composed of ceramic. In still other embodiments, the resistor (e.g., 210a, 210b, 210c) portion of electric braking resistor 200 may be composed of carbon steel. One of ordinary skill in the art will recognize that the composition of electric braking resistor 200 may vary based on an application or design and any type or kind of metal, metal alloy, or composition of material that presents a suitable electrical resistance, power rating, and mechanical footprint may be used in accordance with one or more embodiments of the present invention.

Figure 3A:
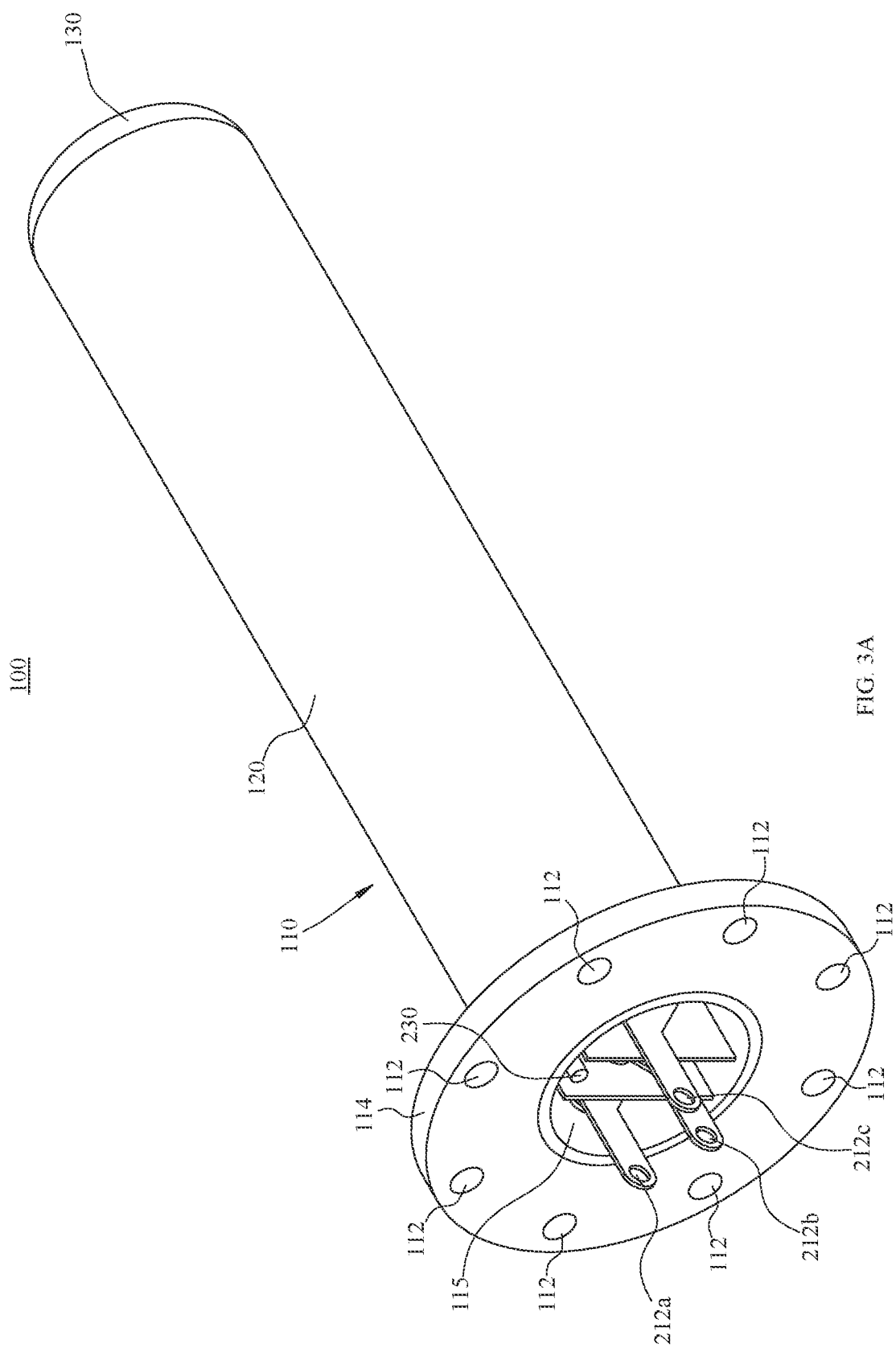
FIG. 3A shows a front-facing perspective view of an electric braking resistor-based heat generator in accordance with one or more embodiments of the present invention.

FIG. 3A shows a front-facing perspective view of an electric braking resistor-based heat generator 100 in accordance with one or more embodiments of the present invention. The connection end (e.g., 114) of housing 110 may be used to secure electric braking resistor-based heat generator 100 in place with respect to the vessel (not shown). First connection end 212a of first braking resistor 210a, second connection end 212b of second braking resistor 210b, and third connection end 212c of third braking resistor 210c may be accessible through flange lumen 115 of flange 114. In operative use, a three-phase electric power source (not shown) may electrically power electric braking resistor 200. In such embodiments, first connection end 212a of first resistor 210a may be electrically connected to a first phase connection (not shown) of the three-phase electric power source (not shown), second connection end 212b of second resistor 210b may be electrically connected to a second phase connection (not shown) of the three-phase electric power source (not shown), and third connection end 212c of third resistor 210c may be electrically connected to a third phase connection (not shown) of the three-phase electric power source (not shown).

Figure 3B:
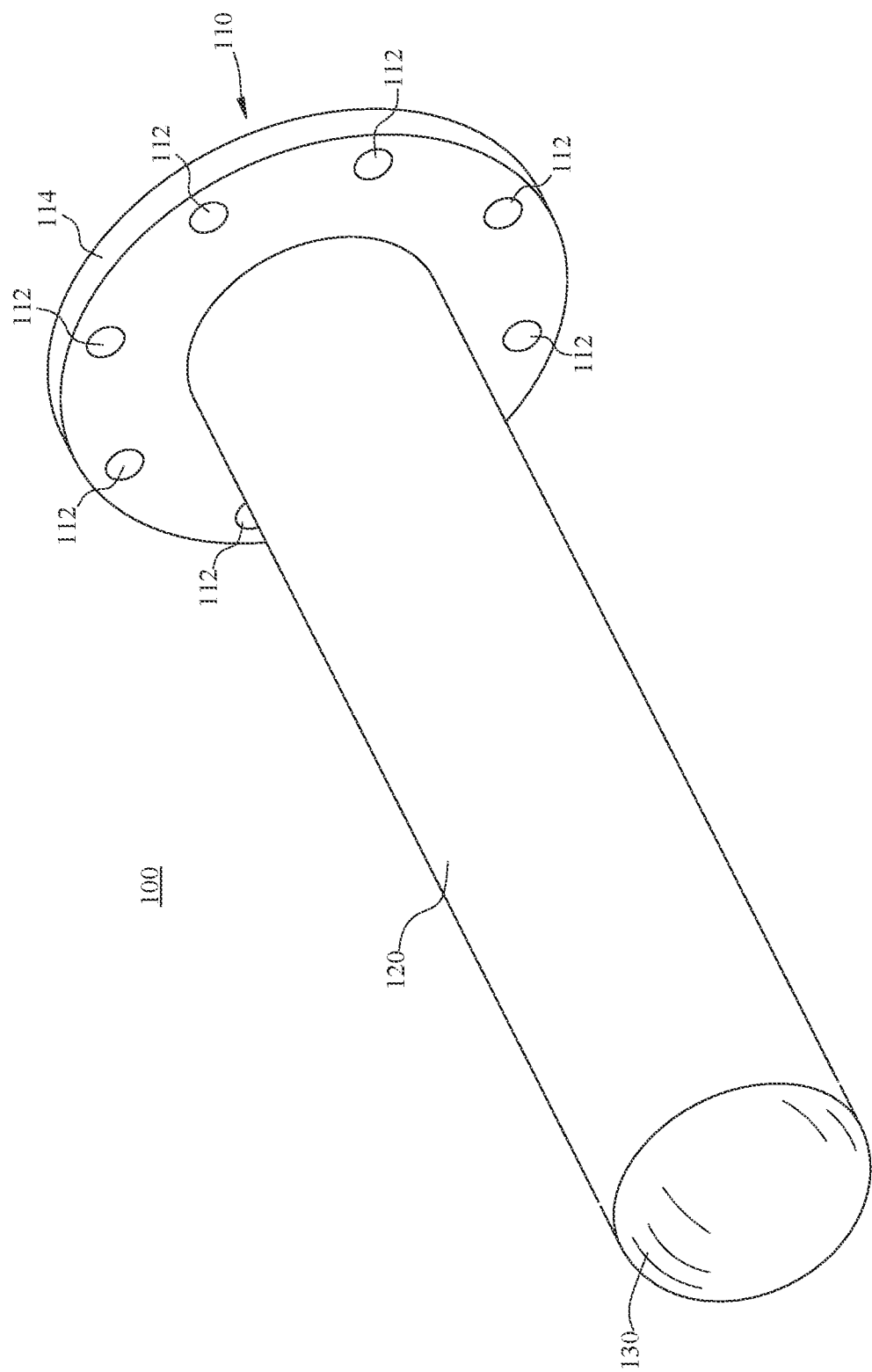
FIG. 3B shows a rear-facing perspective view of the electric braking resistor-based heat generator in accordance with one or more embodiments of the present invention.

Continuing, FIG. 3B shows a rear-facing perspective view of electric braking resistor-based heat generator 100 in accordance with one or more embodiments of the present invention. The enclosed portion of housing 110, represented by body portion 120 and closed end 130, may be removably disposed within a vessel (not shown). In operative use, the enclosed portion of housing 110 may be surrounded by process fluids (not shown) or emulsions (not shown). The electric braking resistor (e.g., 200) may convert electrical energy from an electric power source (not shown) into thermal energy that is thermally communicated via a thermally conductive material (not shown) to housing 210. Housing 210 may be in thermal communication with process fluids (not shown) or emulsions (not shown) disposed within the vessel (not shown). As such, housing 210 may thermally communicate thermal energy from housing 210 to the process fluids (not shown) or emulsions (not shown).

Figure 4A:
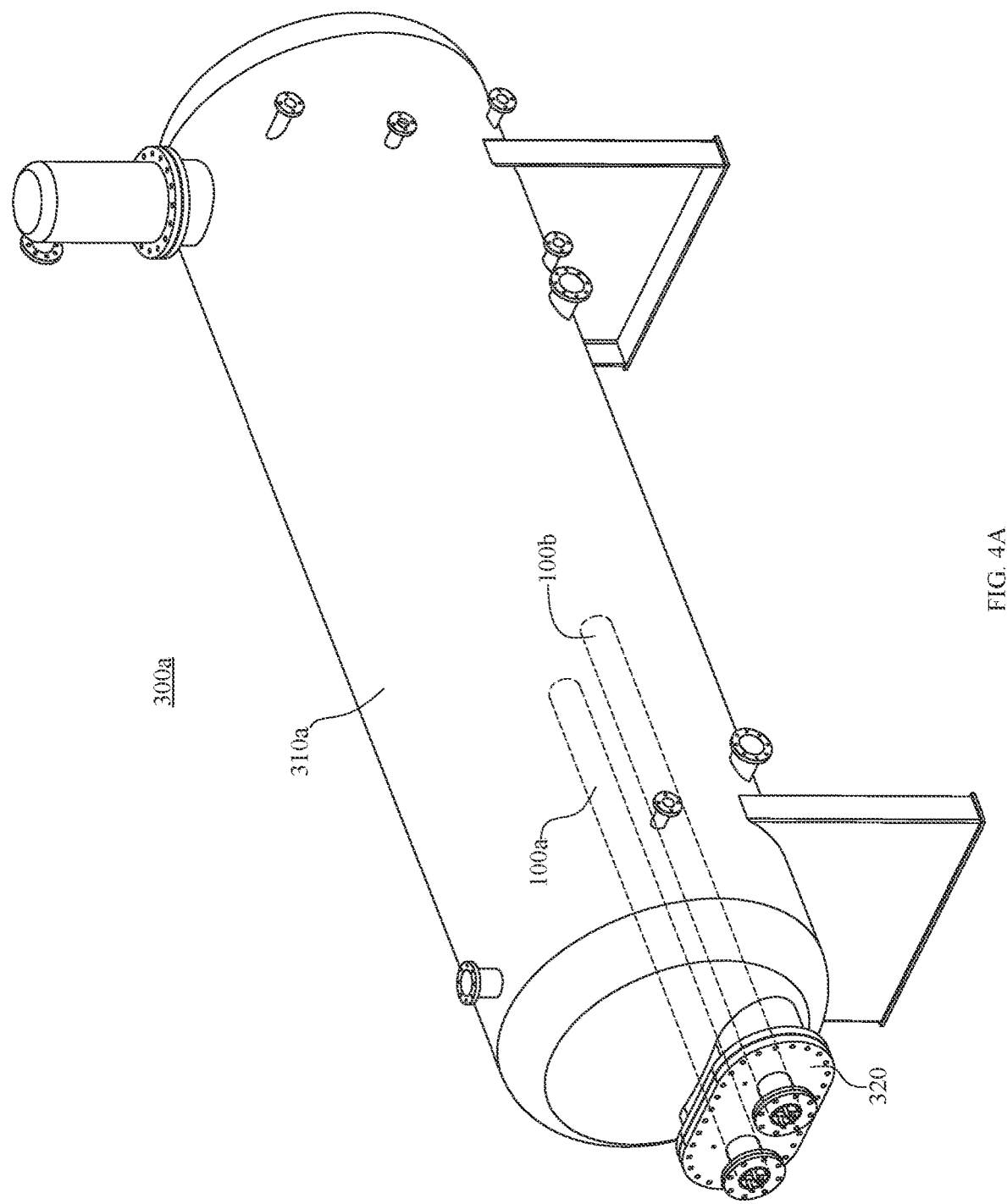
FIG. 4A shows an example of a process fluid or emulsion heating system that includes a plurality of electric braking resistor-based heat generators deployed in a horizontal vessel in accordance with one or more embodiments of the present invention.

FIG. 4A shows an example of a process fluid or emulsion heating system 300a that includes a plurality of electric braking resistor-based heat generators 100a and 100b deployed in a horizontal vessel 310a in accordance with one or more embodiments of the present invention. A conventional horizontal vessel 310a may include an interface 320 to a fluid area of vessel 310a where, for example, a conventional flanged natural draft burner-based fire tube (not shown) may have been used as a heat generator. In such embodiments, electric braking resistor-based heat generator 100 may be used in place of the conventional flanged natural draft burner-based fire tube (not shown) without requiring modification. In the embodiment depicted, a first electric braking resistor-based heat generator 100a and a second electric braking resistor-based heat generator 100b may be at least partially disposed within the fluid area of vessel 310a. Further, one of ordinary skill in the art will recognize that, the size and shape of the housing (e.g., 110) and the electric braking resistor (e.g., 200) of electric braking resistor-based heat generator 100 may be scaled based on an application or design in accordance with one or more embodiments of the present invention.

Figure 4B:
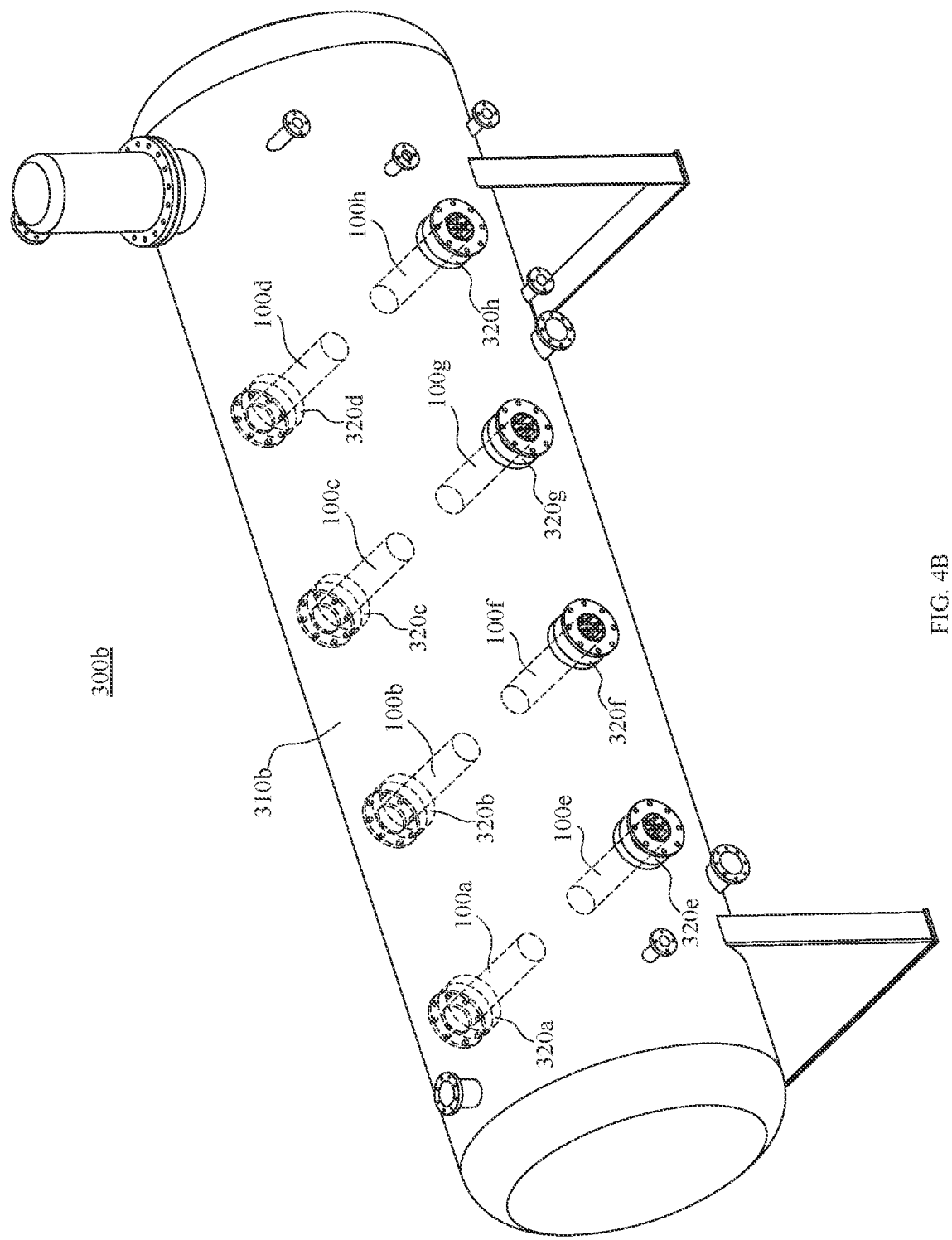
FIG. 4B shows another example of a process fluid or emulsion heating system that includes a plurality of electric braking resistor-based heat generators deployed in a horizontal vessel in accordance with one or more embodiments of the present invention.

Continuing, FIG. 4B shows another example of a process fluid or emulsion heating system 300b that includes a plurality of electric braking resistor-based heat generators 100a-100h deployed in a horizontal vessel 310b in accordance with one or more embodiments of the present invention. Because of the unique characteristics of electric braking resistor-based heat generator 100, new configurations of process fluid or emulsion heating systems may be deployed. A conventional horizontal vessel 310b may be fitted with a plurality of interfaces 320a-320h to a fluid area of vessel 310b. In the embodiment depicted, four electric braking resistor-based heat generators 100a-100d may be at least partially disposed within the fluid area of vessel 310b via four interfaces 320a-320d on one side of vessel 310b and four electric braking resistor-based heat generators 100e-100h may be at least partially disposed within the fluid area of vessel 310b via four interfaces 320e-320h on the other side of vessel 310b. Further, one of ordinary skill in the art will recognize that, the size and shape of the housing (e.g., 110) and the electric braking resistor (e.g., 200) of electric braking resistor-based heat generator 100 may be scaled based on an application or design in accordance with one or more embodiments of the present invention.

Figure 5A:
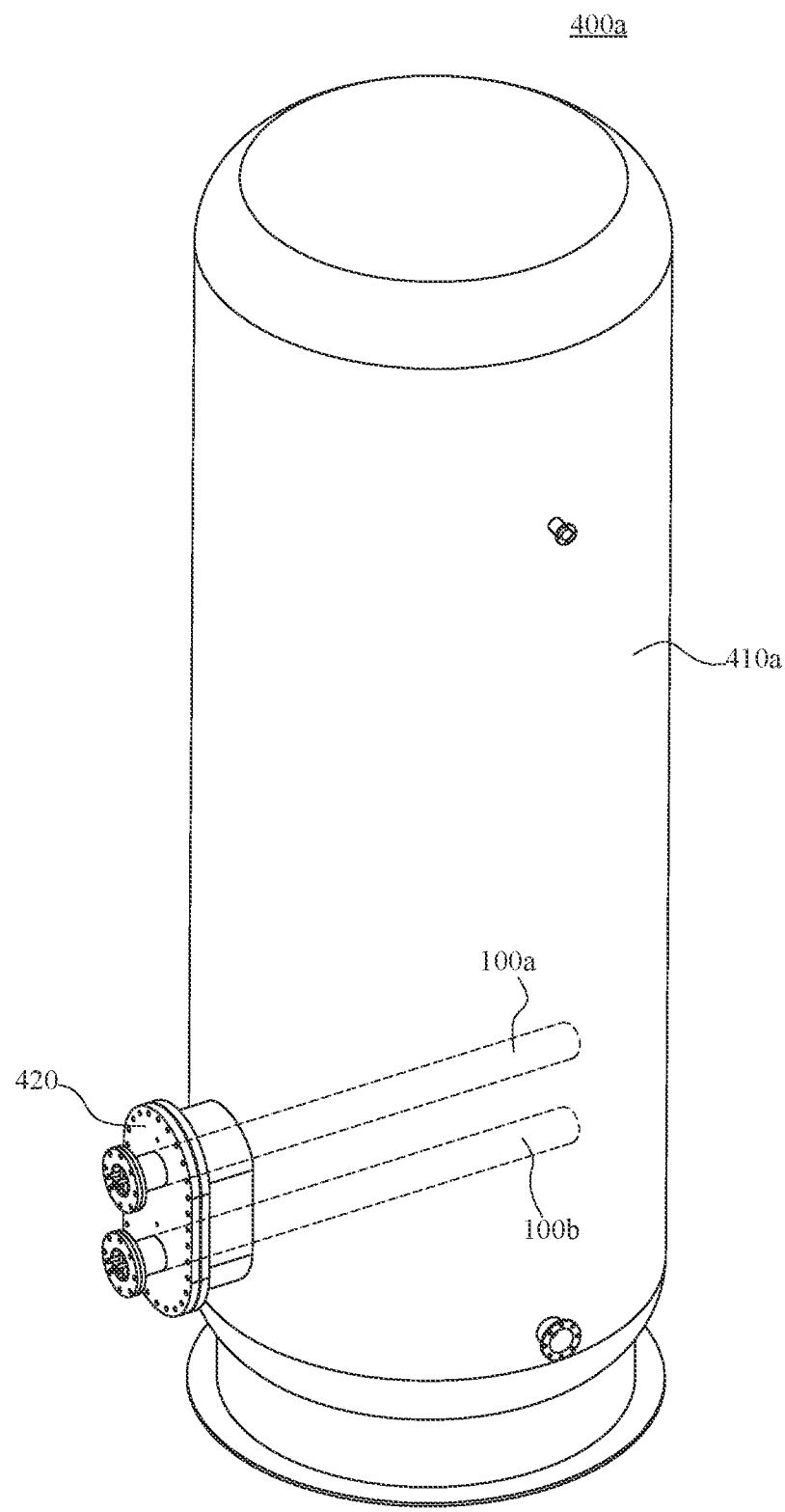
FIG. 5A shows an example of a process fluid or emulsion heating system that includes a plurality of electric braking resistor-based heat generators deployed in a vertical vessel in accordance with one or more embodiments of the present invention.

FIG. 5A shows an example of a process fluid or emulsion heating system 400a that includes a plurality of electric braking resistor-based heat generators 100a and 100b deployed in a vertical vessel 410a in accordance with one or more embodiments of the present invention. A conventional vertical vessel 410a may include an interface 420 to a fluid area of vessel 410a where, for example, a conventional flanged natural draft burner-based fire tube (not shown) may have been used as a heat generator. In such embodiments, electric braking resistor-based heat generator 100 may be used in place of the conventional flanged natural draft burner-based fire tube (not shown) without requiring modification. In the embodiment depicted, a first electric braking resistor-based heat generator 100a and a second electric braking resistor-based heat generator 100b may be at least partially disposed within the fluid area of vessel 410a. Further, one of ordinary skill in the art will recognize that, the size and shape of the housing (e.g., 110) and the electric braking resistor (e.g., 200) of electric braking resistor-based heat generator 100 may be scaled based on an application or design in accordance with one or more embodiments of the present invention.

Figure 5B:
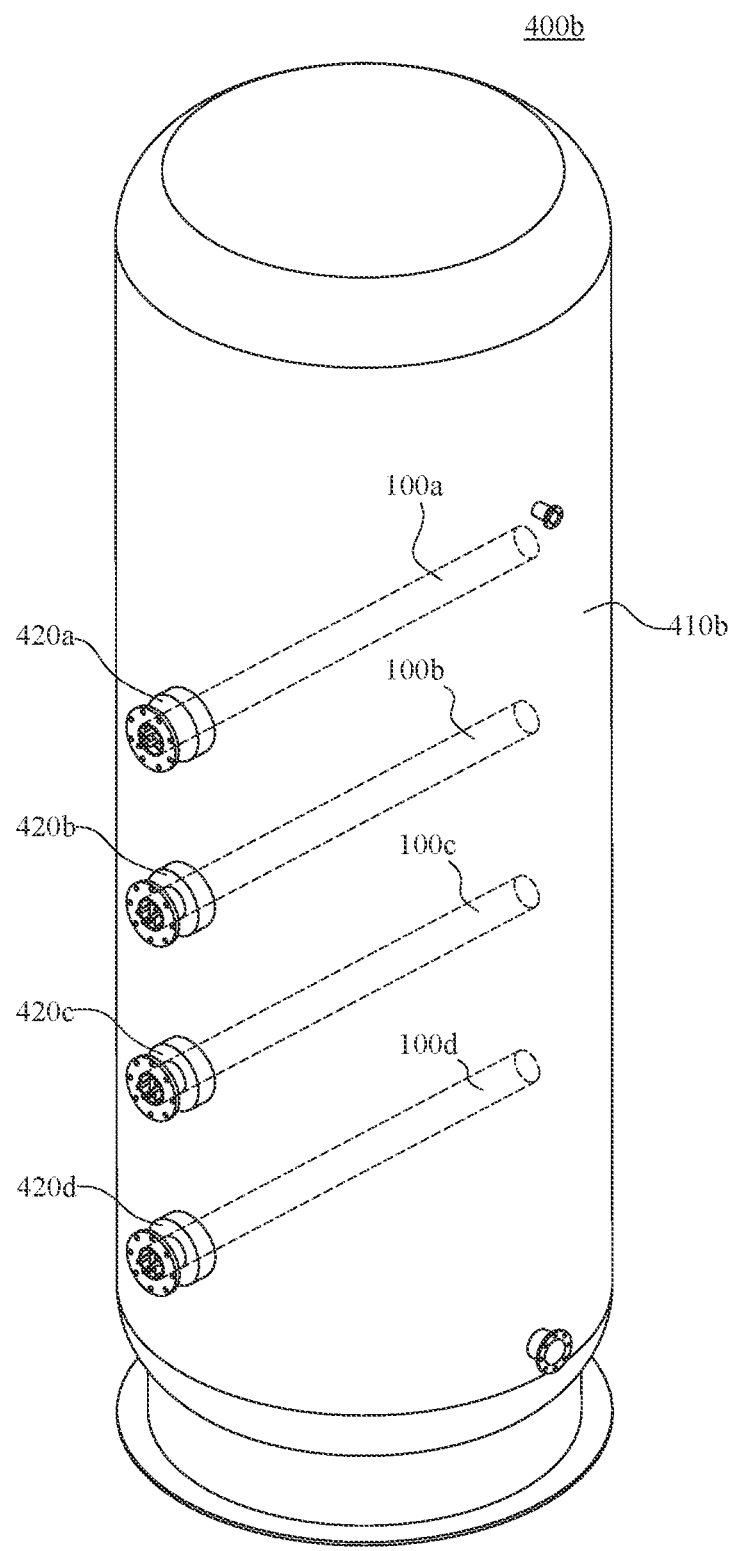
FIG. 5B shows another example of a process fluid or emulsion heating system that includes a plurality of electric braking resistor-based heat generators deployed in a vertical vessel in accordance with one or more embodiments of the present invention.

Continuing, FIG. 5B shows another example of a process fluid or emulsion heating system 400b that includes a plurality of electric braking resistor-based heat generators 100a-100d deployed in a vertical vessel 410b in accordance with one or more embodiments of the present invention. Because of the unique characteristics of the electric braking resistor-based heat generator 100, new configurations of process fluid or emulsion heating systems may be deployed. A conventional vertical vessel 410b may be fitted with a plurality of interfaces 420a-420d to a fluid area of vessel 310b. In the embodiment depicted, four electric braking resistor-based heat generators 100a-100d may be at least partially disposed within the fluid area of vessel 410b via four interfaces 420a-420d. Further, one of ordinary skill in the art will recognize that, the size and shape of the housing (e.g., 110) and the electric braking resistor (e.g., 200) of electric braking resistor-based heat generator 100 may be scaled based on an application or design in accordance with one or more embodiments of the present invention.

One of ordinary skill in the art will recognize that the process fluid or emulsion heating systems 310a, 310b, 410a, and 410b described above are merely exemplary. An electric braking resistor-based heat generator 100 may be scaled in size and shape to accommodate various applications or designs and may be retrofitted to fit almost any existing vessel. Further, electric braking resistor-based heat generator 100 enables new configurations of process fluid or emulsion heating vessels because it does not use a flame, does not combust dangerous gases, and the heating element is not in direct contact with the process fluids or emulsions, thereby permitting the creative placement of the heat generators 100 in relation to the vessel.

Figure 6A:
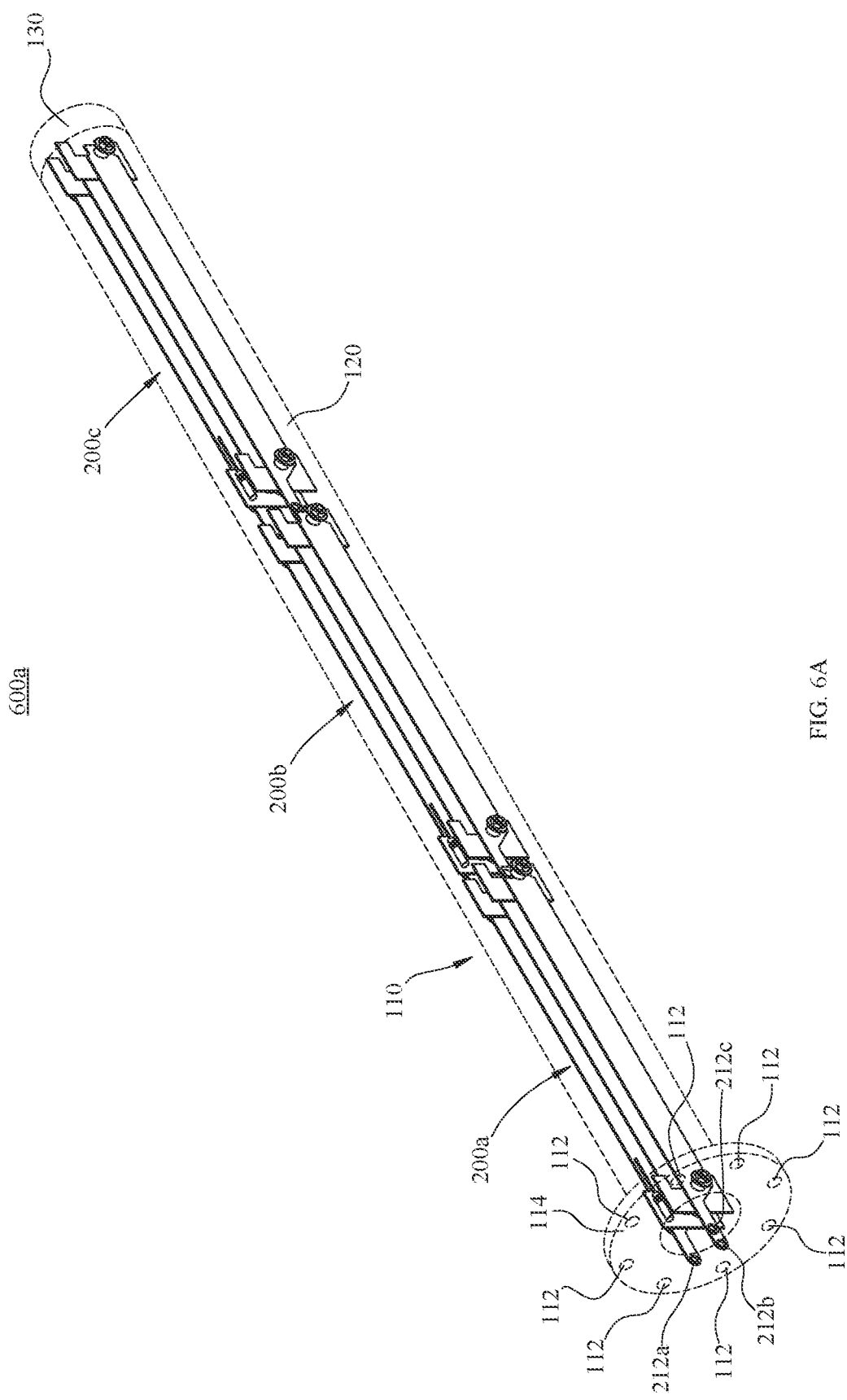
FIG. 6A shows an example of a scaled electric braking resistor-based heat generator in accordance with one or more embodiments of the present invention.

FIG. 6A shows an example of a scaled electric braking resistor-based heat generator 600a in accordance with one or more embodiments of the present invention. As previously discussed, an electric braking resistor-based heat generator (e.g., 100 of FIG. 3) may uniquely be scaled in size or shape. While it is extremely difficult to scale a fire tube in a manner that generates heat uniformly, an electric braking resistor-based heat generator (e.g., 100 of FIG. 3) may be scaled in size or shape and provide substantially uniform heat transfer. In example depicted, a plurality of electric braking resistors 200a, 200b, and 200c may be daisy chained to one another, maintaining three extended braking resistors arranged in an electrical Wye configuration such that only the neutral ends of the distal resistors are shorted together. One of ordinary skill in the art having the benefit of this disclosure will recognize that an electric braking resistor (e.g., 200 of FIG. 2A) may be scaled (not shown) in size (e.g., elongated or shortened) and/or shape (e.g., impacting electrical characteristics) to accommodate a specific application or design in accordance with one or more embodiments of the present invention.

Figure 6B:
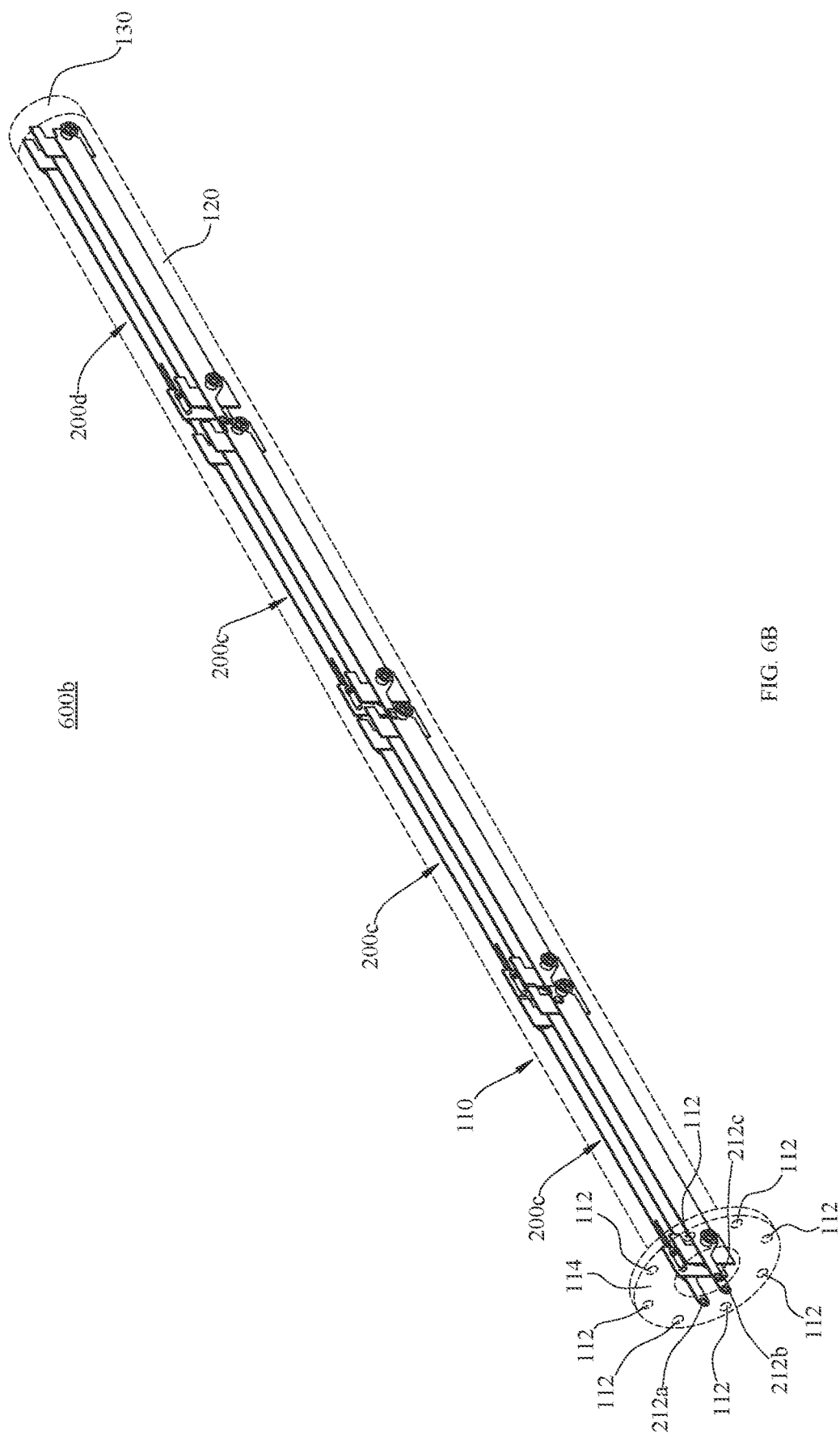
FIG. 6B shows an example of a further scaled electric braking resistor-based heat generator in accordance with one or more embodiments of the present invention.

Continuing, FIG. 6B shows an example of a further scaled electric braking resistor-based heat generator 600b in accordance with one or more embodiments of the present invention. As previously discussed, an electric braking resistor-based heat generator (e.g., 100 of FIG. 3) may uniquely be scaled in size or shape. While it is extremely difficult to scale a fire tube in a manner that generates heat uniformly, an electric braking resistor-based heat generator (e.g., 100 of FIG. 3) may be scaled in size or shape and provide substantially uniform heat transfer. In the example depicted, a plurality of electric braking resistors 200a, 200b, 200c, and 200d may be daisy chained to one another, maintaining three electric braking resistors arranged in an electrical Wye configuration such only the distal neutral ends of the resistors are shorted together. One of ordinary skill in the art having the benefit of this disclosure will recognize that an electric braking resistor (e.g., 200 of FIG. 2A) may be scaled (not shown) in size (e.g., elongated or shortened) and/or shape (e.g., impacting electrical characteristics) to accommodate a specific application or design in accordance with one or more embodiments of the present invention.

One of ordinary skill in the art will recognize that the size, shape, or construction of individual resistors of an electric braking resistor may vary so long as they meet the required electrical resistance, power rating, and mechanical footprint of a particular application or design, in accordance with one or more embodiments of the present invention.

Figure 7:
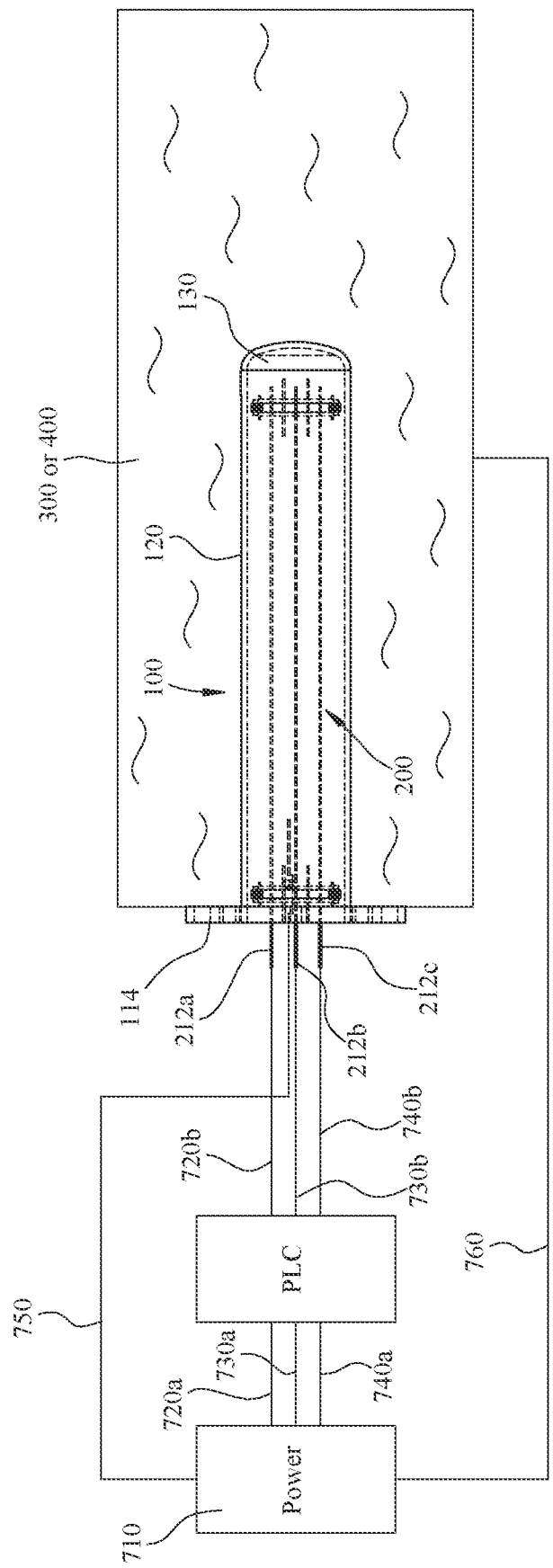
FIG. 7 shows a controller for an electric braking resistor-based heat generator in accordance with one or more embodiments of the present invention.

FIG. 7 shows a controller 710 for an electric braking resistor-based heat generator 100 in accordance with one or more embodiments of the present invention. An electric braking resistor-based heat generator 100 converts electrical energy provided by an electric power source 705 to thermal energy that is thermally communicated to process fluids or emulsions disposed within a vessel (e.g., 300 or 400). A controller 710 may be used to control the delivery of electrical energy to the electric braking resistor (e.g., 200 of FIG. 2A) of electric braking resistor-based heat generator 100. Controller 710 may be a programmable logic controller ("PLC"), an industrial control system, or any other type or kind of computing system capable of controlling the delivery of power from an electric power source 705. In certain embodiments, electric power source 705 may be a 480 volt three-phase electric power supply having a first phase connection 720a output, a second phase connection 730a output, and a third phase connection 740a output that provide a voltage of substantially equal magnitude and a 120-degree phase shift between each phase.

In certain embodiments, first phase connection 720a output, second phase connection 730a output, and third phase connection 740a output of electric power source 705 may be directly connected to first connection end 212a of electric braking resistor 200, second connection end 212b of electric braking resistor 200, and third connection end 212c of electric braking resistor 200 respectively. In such embodiments, controller 710 may directly control electric power source (not shown).

In other embodiments, first phase connection 720a output, second phase connection 730a output, and third phase connection 740a output of electric power source 705 may be controllably passed through controller 710 to electric braking resistor 200. In such embodiments, first phase connection 720a output may be controllably electrically connected 720b to first connection end 212a of electric braking resistor 200, second phase connection 730a may be controllably electrically connected 730b to second connection end 212b of electric braking resistor 200, and third phase connection 740a may be controllably electrically connected 740b to third connection end 212c of electric braking resistor 200. In this way, controller 710 may controllably make or break the connection between first phase connection 720a, second phase connection 730a, and third phase connection 740a and first connection end 212a, second connection end 212b, and third connection end 212c respectively of electric braking resistor 200.

One of ordinary skill in the art will recognize that any other type or kind of connectivity that permits the controllable delivery of electrical energy to electric braking resistor 200 may be used in accordance with one or more embodiments of the present invention.

In certain embodiments, controller 710 may control or modulate an amount of electrical energy that is converted into thermal energy by controlling or modulating an application of electrical energy to the electric braking resistor 200.

In other embodiments, controller 710 may control or modulate an amount of electrical energy that is converted into thermal energy by controlling or modulating an application of electrical energy to the electric braking resistor 200 to achieve a target temperature within housing 110 of electric braking resistor-based heat generator 100. A thermal sensor (e.g., 230 of FIG. 2A) may be disposed within the enclosed portion of housing 110 and sense a temperature within it that is input to controller 710 and used by controller 710 to modulate or control the application of electrical energy to achieve the target temperature within the housing 110.

In still other embodiments, controller 710 may control or modulate an amount of electrical energy that is converted into thermal energy by controlling or modulating an application of electrical energy to the electric braking resistor 200 to achieve a target temperature of the process fluids or emulsions within the vessel 300 or 400, outside of housing 110. A thermal sensor (not shown) may be disposed within the fluid area of vessel 300 or 400 and sense a temperature within it that is input to controller 710 and used by controller 710 to modulate or control the application of electrical energy to achieve the target temperature within the vessel 300 or 400.

In still other embodiments, controller 710 may control or modulate an amount of electrical energy that is converted into thermal energy by controlling or modulating an application of electrical energy to the electric braking resistor 200 to achieve a function of a target temperature within housing 110 of electric braking resistor-based heat generator 100 and a target temperature of the process fluids or emulsions within the vessel 300 or 400, outside of housing 110. A first thermal sensor (e.g., 230 of FIG. 2A) may be disposed within the enclosed portion of housing 110 and sense a temperature within it that is input to controller 710 and a second thermal sensor (not shown) may be disposed within the fluid area of vessel 300 or 400 and sense a temperature within it that is input to controller 710, both of which may be used by controller 710 to modulate or control the application of electrical energy to achieve a function of the target temperature within housing 110 of electric braking resistor-based heat generator 100 and the target temperature within the vessel 300 or 400, outside of housing 110.

In still other embodiments, controller 710 may control or modulate an amount of electrical energy that is converted into thermal energy by controlling or modulating an application of electrical energy to the electric braking resistor 200 based on a predetermined program. The program may include programmable periods of time during which electrical energy is provided to electric braking resistor 200, programmable periods of time during which electrical energy is not provided to electric braking resistor 200, and one or more programmable sequences of such periods.

One of ordinary skill in the art, having the benefit of this disclosure, will recognize that controller 710 may independently control the application of electrical energy on a per phase basis, or collectively, based on sensor data, predetermined programs, or user input, or any combination thereof, in accordance with one or more embodiments of the present invention.

Advantages of one or more embodiments of the present invention may include one or more of the following:

In one or more embodiments of the present invention, an electric braking resistor-based heat generator uses an electrically powered braking resistor subassembly as the heat source. While electric braking resistors are typically used to rapidly discharge high voltages by converting electrical energy into thermal energy, the electric braking resistor-based heat generator purposefully sinks power into the electric braking resistor subassembly for the sole purpose of generating heat that is controllably conveyed to process fluids or emulsions.

In one or more embodiments of the present invention, an electric braking resistor-based heat generator includes a heat source that is electrically powered, does not require a gas-based fuel, does not require a flame, and does not create any harmful emissions.

In one or more embodiments of the present invention, an electric braking resistor-based heat generator includes a heat source that is physically isolated from the process fluids or emulsions and is highly efficient in converting electrical energy into thermal energy.

In one or more embodiments of the present invention, an electric braking resistor-based heat generator provides the unique ability to control or modulate the temperature of the heat generator.

In one or more embodiments of the present invention, an electric braking resistor-based heat generator requires fewer parts, is easier to maintain, and costs less to operate than conventional heat generators.

While the present invention has been described with respect to the above-noted embodiments, those skilled in the art, having the benefit of this disclosure, will recognize that other embodiments may be devised that are within the scope of the invention as disclosed herein. The Brief Description of the Invention and the Abstract merely represent one or more embodiments of the claimed invention and should not be construed so as to limit the breadth of the claimed invention. Accordingly, the scope of the invention should only be limited by the appended claims.

The invention claimed is:

1. An electric braking resistor-based heat generator for process fluids or emulsions comprising:
   a housing comprising a connection end, a body portion, and a closed end, wherein at least part of the housing forms an at least partially enclosed portion;
   an electric braking resistor at least partially disposed within the enclosed portion of the housing, wherein the electric braking resistor comprises:
      a first plate resistor comprising a first connection end and a first neutral end,
      a second plate resistor comprising a second connection end and a second neutral end, and
      a third plate resistor comprising a third connection end and a third neutral end,
      wherein the first plate resistor, the second plate resistor, and the third plate resistor are arranged in a Wye configuration, and
      wherein the first neutral end, the second neutral end, and the third neutral end are electrically shorted together; and
   a thermally conductive material disposed within the enclosed portion of the housing that provides thermal communication between the electric braking resistor and the housing,
   wherein the electric braking resistor converts electrical energy provided by a three-phase electric power source into thermal energy that is thermally communicated from the housing to the process fluids or emulsions.

2. The electric braking resistor-based heat generator of claim 1, further comprising a controller for the electric power source.

3. The electric braking resistor-based heat generator of claim 1, further comprising a thermal sensor disposed within the enclosed portion of the housing.

4. The electric braking resistor-based heat generator of claim 2, wherein the controller controls or modulates an amount of electrical energy that is converted into thermal energy by controlling or modulating an application of electrical energy to the electric braking resistor.

5. The electric braking resistor-based heat generator of claim 2, wherein the controller controls or modulates an amount of electrical energy that is converted into thermal energy by controlling or modulating an application of electrical energy to the electric braking resistor to achieve a target temperature within the housing.

6. The electric braking resistor-based heat generator of claim 2, wherein the controller controls or modulates an amount of electrical energy that is converted into thermal energy by controlling or modulating an application of electrical energy to the electric braking resistor to achieve a target temperature of the process fluids or emulsions.

7. The electric braking resistor-based heat generator of claim 2, wherein the controller controls or modulates an amount of electrical energy that is converted into thermal energy by controlling or modulating an application of electrical energy to the electric braking resistor based on a predetermined program.

8. The electric braking resistor-based heat generator of claim 1, wherein the connection end of the housing comprises a flange plate having a plurality of flange mounting holes and a flange lumen that provides access to the enclosed portion of the housing.

9. The electric braking resistor-based heat generator of claim 1, wherein the first connection end of the first plate resistor is connected to a first phase connection of the three-phase electric power source, the second connection end of the second plate resistor is connected to a second phase connection of the three-phase electric power source, and the third connection end of the third plate resistor is connected to a third phase connection of the three-phase electric power source.

10. The electric braking resistor-based heat generator of claim 1, wherein the thermally conductive material is composed of quartzite, granite, or porcelain, or combinations thereof.

11. A process fluid or emulsion heating system comprising:
a vessel for process fluids or emulsions;
an electric braking resistor-based heat generator at least partially disposed within the vessel, wherein the electric braking-resistor-based heat generator comprises
a housing comprising a connection end, a body portion, and a closed end, wherein at least part of the housing forms an at least partially enclosed portion,
an electric braking resistor at least partially disposed within the enclosed portion of the housing, wherein the electric braking resistor comprises:
a first plate resistor comprising a first connection end and a first neutral end,
a second plate resistor comprising a second connection end and a second neutral end, and
a third plate resistor comprising a third connection end and a third neutral end,
wherein the first plate resistor, the second plate resistor, and the third plate resistor are arranged in a Wye configuration, and
wherein the first neutral end, the second neutral end, and the third neutral end are electrically shorted together, and
a thermally conductive material disposed within the enclosed portion of the housing that provides thermal communication between the electric braking resistor and the housing;
a three-phase electric power source electrically connected to the electric braking resistor; and
a controller for the electric power source that controls an application of electrical energy to the electric braking resistor,
wherein the electrical energy is converted into thermal energy that is thermally communicated from the housing to the process fluids or emulsions within the vessel.

12. The process fluid or emulsion heating system of claim 11, further comprising a first thermal sensor disposed within the housing.

13. The process fluid or emulsion heating system of claim 11, further comprising a second thermal sensor disposed outside of the housing but within the vessel.

14. The process fluid or emulsion heating system of claim 11, wherein the controller controls or modulates an amount of electrical energy that is converted into thermal energy by controlling or modulating an application of electrical energy to the electric braking resistor.

15. The process fluid or emulsion heating system of claim 11, wherein the controller controls or modulates an amount of electrical energy that is converted into thermal energy by controlling or modulating an application of electrical energy to the electric braking resistor to achieve a target temperature within the housing.

16. The process fluid or emulsion heating system of claim 11, wherein the controller controls or modulates an amount of electrical energy that is converted into thermal energy by controlling or modulating an application of electrical energy to the electric braking resistor to achieve to achieve a target temperature of the process fluids or emulsions.

17. The process fluid or emulsion heating system of claim 11, wherein the controller controls or modulates an amount of electrical energy that is converted into thermal energy by controlling or modulating an application of electrical energy to the electric braking resistor based on a predetermined program.

18. The process fluid or emulsion heating system of claim 11, wherein the connection end of the housing comprises a flange plate having a plurality of flange mounting holes and a flange lumen that provides access to the enclosed portion of the housing.

19. The process fluid or emulsion heating system of claim 11, wherein the first connection end of the first plate resistor is connected to a first phase connection of the three-phase electric power source, the second connection end of the second plate resistor is connected to a second phase connection of the three-phase electric power source, and the third connection end of the third plate resistor is connected to a third phase connection of the three-phase electric power source.

20. The process fluid or emulsion heating system of claim 11, wherein the thermally conductive material is composed of quartzite, granite, or porcelain, or combinations thereof.

* * * * *